United States Patent
Rajagopalan et al.

(10) Patent No.: US 11,463,362 B2
(45) Date of Patent: *Oct. 4, 2022

(54) DYNAMIC TOKEN BUCKET METHOD ADAPTIVE TO OPAQUE SERVER LIMITS

(71) Applicant: NetSkope, Inc., Santa Clara, CA (US)

(72) Inventors: Chandrasekaran Rajagopalan, San Jose, CA (US); Brian Miller, Moraga, CA (US)

(73) Assignee: NetSkope, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,768

(22) Filed: Mar. 7, 2022

(65) Prior Publication Data

US 2022/0247686 A1 Aug. 4, 2022

Related U.S. Application Data

(63) Continuation-in-part of application No. 17/163,285, filed on Jan. 29, 2021, now Pat. No. 11,271,953.

(51) Int. Cl.
*H04L 47/12* (2022.01)
*H04L 47/28* (2022.01)
*H04L 67/02* (2022.01)

(52) U.S. Cl.
CPC .............. *H04L 47/12* (2013.01); *H04L 47/28* (2013.01); *H04L 67/02* (2013.01)

(58) Field of Classification Search
CPC . H04L 63/1416; H04L 63/20; H04L 63/1458; H04L 63/1466; H04L 63/1441; H03L 63/1425

(Continued)

(56) References Cited

U.S. PATENT DOCUMENTS 6,574,655 B1 6/2003 Libert et al.
7,958,147 B1 6/2011 Turner et al.
(Continued)

FOREIGN PATENT DOCUMENTS

JP 2012084141 A 4/2012
JP 2015130112 A 7/2015
(Continued)

OTHER PUBLICATIONS

Cheng et al., "Cloud Security for Dummies, Netskope Special Edition," John Wiley & Sons, Inc. 2015.
(Continued)

*Primary Examiner* — Longbit Chai
(74) *Attorney, Agent, or Firm* — Haynes Beffel & Wolfeld LLP; Ernest J. Beffel, Jr.

(57) ABSTRACT

A method and system for reducing triggering of throughput penalties imposed on a group of users by a software-as-a-service (SaaS) server due to Application Programming Interface (API) calls exceeding limits of the SaaS server is disclosed. The approaches include actions of intercepting requests to the SaaS server from a user group and monitoring both a rate of API calls for the requests and a rate of API events generated by forwarding the API calls to the SaaS server, intercepting the SaaS server's responses, where some of the responses indicate a throughput penalty imposed by the server, inferring load conditions of the SaaS server by analyzing the varying rate of API events against the responses with imposition of throughput penalty and setting an API call throttle limit dynamically adaptive to the inferred load conditions, then throttling the rate of the API calls for the group's requests according to the throttle limit.

20 Claims, 15 Drawing Sheets

(58) Field of Classification Search
USPC .......................................................... 726/23
See application file for complete search history.

(56) References Cited

U.S. PATENT DOCUMENTS

| | | | |
|---|---|---|---|
| 7,996,373 | B1 | 8/2011 | Zoppas et al. |
| 8,073,255 | B2 | 12/2011 | Nishikawa |
| 8,127,365 | B1 | 2/2012 | Liu et al. |
| 8,130,747 | B2 | 3/2012 | Li et al. |
| 8,438,630 | B1 | 5/2013 | Clifford |
| 8,544,060 | B1 | 9/2013 | Khetawat |
| 8,572,758 | B1 | 10/2013 | Clifford |
| 8,578,485 | B2 | 11/2013 | Yu |
| 8,613,040 | B2 | 12/2013 | Barile |
| 8,613,070 | B1 | 12/2013 | Borzycki et al. |
| 8,763,072 | B2 | 6/2014 | Agrawal |
| 8,776,249 | B1 | 7/2014 | Margolin |
| 8,799,911 | B2 * | 8/2014 | Santoli ................. G06Q 10/06 718/101 |
| 8,819,772 | B2 | 8/2014 | Bettini et al. |
| 8,914,892 | B2 | 12/2014 | Karande et al. |
| 9,002,909 | B2 | 4/2015 | Hockey |
| 9,069,992 | B1 | 6/2015 | Vaikar et al. |
| 9,098,459 | B2 | 8/2015 | Davis et al. |
| 9,137,131 | B1 | 9/2015 | Sarukkai et al. |
| 9,171,008 | B2 | 10/2015 | Prahlad et al. |
| 9,230,096 | B2 | 1/2016 | Sarin et al. |
| 9,246,948 | B2 | 1/2016 | Jaiswal et al. |
| 9,256,727 | B1 | 2/2016 | Manmohan |
| 9,258,274 | B2 * | 2/2016 | Hansen ............... H04L 63/0227 |
| 9,286,301 | B2 | 3/2016 | Motoyama |
| 9,350,735 | B1 | 5/2016 | Parmar et al. |
| 9,418,232 | B1 | 8/2016 | Khetawat et al. |
| 9,547,712 | B2 | 1/2017 | Kraley |
| 9,613,190 | B2 | 4/2017 | Ford et al. |
| 9,619,649 | B1 | 4/2017 | Yun |
| 9,626,528 | B2 | 4/2017 | Butler |
| 10,104,052 | B2 | 10/2018 | Smith et al. |
| 10,133,855 | B2 | 11/2018 | Stappenbeck et al. |
| 10,162,767 | B2 | 12/2018 | Spurlock et al. |
| 10,235,520 | B2 | 3/2019 | Bae |
| 10,291,657 | B2 | 5/2019 | Narayanaswamy et al. |
| 10,349,304 | B2 | 7/2019 | Kim et al. |
| 10,594,730 | B1 | 3/2020 | Summers et al. |
| 10,609,206 | B1 | 3/2020 | Dannamaneni et al. |
| 10,783,447 | B2 | 9/2020 | Kochura et al. |
| 10,803,188 | B1 | 10/2020 | Rajput et al. |
| 10,812,531 | B2 | 10/2020 | Narayanaswamy et al. |
| 11,064,013 | B2 | 7/2021 | Cheng et al. |
| 2005/0289354 | A1 | 12/2005 | Borthakur et al. |
| 2007/0039018 | A1 | 2/2007 | Saslow et al. |
| 2008/0104118 | A1 | 5/2008 | Pulfer et al. |
| 2008/0127303 | A1 | 5/2008 | Wrighton et al. |
| 2008/0216174 | A1 | 9/2008 | Vogel et al. |
| 2009/0172162 | A1 | 7/2009 | Wood |
| 2010/0146269 | A1 | 6/2010 | Baskaran |
| 2011/0047590 | A1 | 2/2011 | Carr et al. |
| 2011/0131408 | A1 | 6/2011 | Cook et al. |
| 2011/0219424 | A1 | 9/2011 | Panasyuk et al. |
| 2011/0219451 | A1 | 9/2011 | McDougal et al. |
| 2012/0278872 | A1 | 11/2012 | Woelfel et al. |
| 2013/0297749 | A1 | 11/2013 | Zhang et al. |
| 2014/0007182 | A1 | 1/2014 | Qureshi et al. |
| 2014/0007222 | A1 | 1/2014 | Qureshi et al. |
| 2014/0026181 | A1 | 1/2014 | Kiang et al. |
| 2014/0026182 | A1 | 1/2014 | Pearl et al. |
| 2015/0172120 | A1 | 6/2015 | Dwarampudi et al. |
| 2015/0271207 | A1 | 9/2015 | Jaiswal et al. |
| 2016/0142647 | A1 | 5/2016 | Gopinath et al. |
| 2016/0269467 | A1 | 9/2016 | Lee et al. |
| 2016/0275577 | A1 | 9/2016 | Kolluri Venkata Sesha et al. |
| 2016/0277374 | A1 | 9/2016 | Reid et al. |
| 2016/0285918 | A1 | 9/2016 | Peretz et al. |
| 2016/0292445 | A1 | 10/2016 | Lindemann |
| 2017/0063720 | A1 | 3/2017 | Foskett et al. |
| 2017/0091453 | A1 | 3/2017 | Cochin |
| 2017/0091482 | A1 | 3/2017 | Sarin et al. |
| 2017/0093867 | A1 | 3/2017 | Burns et al. |
| 2017/0099344 | A1 * | 4/2017 | Hadfield ................. H04L 63/20 |
| 2017/0192940 | A1 | 7/2017 | Ghatage et al. |
| 2017/0206353 | A1 | 7/2017 | Jai et al. |
| 2017/0264640 | A1 | 9/2017 | Narayanaswamy et al. |
| 2018/0034837 | A1 | 2/2018 | Lakhani et al. |
| 2018/0063182 | A1 | 3/2018 | Jones et al. |
| 2018/0324204 | A1 | 11/2018 | McClory et al. |
| 2019/0034295 | A1 | 1/2019 | Bourgeois et al. |
| 2019/0180048 | A1 | 6/2019 | Koduri et al. |
| 2020/0177556 | A1 | 6/2020 | Subbarayan et al. |
| 2020/0372040 | A1 | 11/2020 | Boehmann et al. |

FOREIGN PATENT DOCUMENTS

| | | |
|---|---|---|
| WO | 2006137057 A2 | 12/2006 |
| WO | 2007009255 A1 | 1/2007 |
| WO | 2012058487 A2 | 5/2012 |
| WO | 2019226363 A1 | 11/2019 |
| WO | PCT/US2022/014441 | 2/2022 |

OTHER PUBLICATIONS

"Netskope Introspection," netSkope, Inc., 2015, 3 pgs.
Netskope, "Data Loss Prevention and Monitoring in the Cloud", Nov. 2014, 18 pages.
"Cloud Data Loss Prevention Reference Architecture", Sep. 2015, Netskope, WP-88-1, 2 pages.
"The Netskope Active Platform Enabling Safe Migration to the Cloud", Apr. 2015, DS-1-8, Netskope, Inc., 6 pages.
"The Netskope Advantage: Three "Must-Have" Requirements for Cloud Access Security Brokers", Jul. 2015, WP-12-2, 4 pages.
"Netskope The 15 Critical CASB Use Cases", Netskope, Inc., EB-141-1, 19 pages.
"Repave the Cloud-Data Breach Collision Course," netskope, Inc., 2014, 6 pgs.
U.S. Appl. No. 17/163,285—Non-final Office Action dated Mar. 18, 2021, 11 pages.
PCT/US2017/021969—International Search Report and Written Opinion dated Jun. 22, 2017, 11 pages.
Laminin Solutions: "Metadata Permissions Protects Confidential Information", Feb. 19, 2013, pp. 1-2 XP002770913.
Yague et al., "A Metadata-based access control model for web services", Computer Science Department, Internet Research, vol. 15, No. 1, University of Malaga, Malaga, Spain, Dec. 31, 2005, pp. 99-116, XP002770914.
Gowadia etal., "RDF Metadata for XML Access Control", Proceedings of the ACM Workshop on XML Security 2003. Fairfax, VA, Oct. 31, 2003, pp. 39-48, XP001198168.
Kuwabara et al., "Use of Metadata for Access Control and Version Management in RDF Database", Sep. 12, 2011, Knowledge-Based and Intelligent Information and Engineering Systems, Springer Berling Heidelberg, pp. 326-336, XP019164752.
PCT/US2017/021969—International Preliminary Report on Patentability dated Mar. 5, 2018, 13 pages.
U.S. Appl. No. 15/368,240—Office Action dated Aug. 7, 2018, 28 pages.
U.S. Appl. No. 16/000,132—Office Action dated Oct. 2, 2018, 18 pages.
U.S. Appl. No. 15/368,240—Response to Office Action dated Aug. 7, 2018, filed Oct. 11, 2018, 25 pages.
U.S. Appl. No. 16/000,132—Response to Office Action dated Oct. 2, 2018, filed Nov. 13, 2018, 16 pages.
U.S. Appl. No. 16/000,132—Notice of Allowance dated Dec. 28, 2018, 16 pages.
U.S. Appl. No. 15/368,240—Office Action dated Feb. 8, 2019, 28 pages.
JP-20185473875—Notice of Allowance with Allowed Claims dated Mar. 25, 2019, 7 pages.
EP-17713822.9, Rule 71(3) Allowance Communication dated Mar. 8, 2019, 147 pages.

(56) References Cited

OTHER PUBLICATIONS

PCT/US2019/031867—International Search Report and Written Opinion dated Sep. 9, 2019, 20 pages.
EP-19189235.5 Extended European Search Report dated Nov. 27, 2019, 5 pages.
U.S. Appl. No. 15/368,240—Office Action dated Dec. 26, 2019, 40 pages.
U.S. Appl. No. 15/368,246—Office Action dated Apr. 5, 2019, 24 pages.
U.S. Appl. No. 15/368,246—Response to Office Action dated Apr. 5, 2019, filed May 3, 2019, 16 pages.
U.S. Appl. No. 15/368,246—Supplemental Response to Office Action dated Apr. 5, 2019, filed Oct. 25, 2019, 8 pages.
U.S. Appl. No. 15/368,240—Response to Final Office Action dated Feb. 8, 2019 filed Apr. 19, 2019, 32 pages.
Kark et al, "Trends: Calculating the Cost of a Security Breach", Forrester Research, Inc. Apr. 10, 2007, 7 pgs.
"Data Breach: The Cloud Multiplier Effect", Ponemon Institute, Jun. 4, 2014, 27 pages.
Riley et al, "Magic Quadrant for Cloud Access Security Brokers", Nov. 30, 2017, 28 pages, downloaded from—https://go.netskope.com/typ-gartner-mq-for-casb.html.
Lakshman et al, "Cassandra—A Decentralized Structured Storage System", 2009, 6 pages.
DeCandia et al, "Dynamo: Amazon's Highly Available Key-value Store", SOSP '07, Oct. 14-17, 2007, 16 pages.
Chang et al, "Bigtable: A Distributed Storage System for Structured Data", Operating Systems Design and Implementation, OSDI, 2006, 14 pages.
U.S. Appl. No. 15/368,246—Office Action dated Jan. 27, 2020, 20 pages.
U.S. Appl. No. 16/783,146—Office Action dated Mar. 27, 2020, 26 pages.
U.S. Appl. No. 16/783,146—Response to Office Action dated Mar. 27, 2020, filed Jun. 4, 2020, 21 pages.
U.S. Appl. No. 16/783,146—Notice of Allowance dated Jun. 17, 2020, 13 pages.
U.S. Appl. No. 15/368,240—Notice of Allowance dated Jun. 29, 2020, 22 pages.
Sumit Khurana, et. al., "Performance evaluation of Virtual Machine (VM) scheduling policies in Cloud computing (spaceshared & timeshared)"; 2013 Fourth International Conference on Computing, Communications and Networking Technologies (ICCCNT); Year: Jul. 2013; pp. 1-5.
U.S. Appl. No. 16/409,685—Office Action dated Jul. 14, 2020, 28 pages.
U.S. Appl. No. 15/368,246—Notice of Allowance dated Oct. 6, 2020, 22 pages.
PCT/US2019/031867—International Preliminary Report on Patentability, dated Nov. 24, 2020, 12 pages.
U.S. Appl. No. 16/409,685—Notice of Allowance dated Dec. 3, 2020, 18 pages.
U.S. Appl. No. 15/368,240—Response to Office Action dated Dec. 26, 2019, filed May 26, 2020, 12 pages.
U.S. Appl. No. 15/368,246—Response to Office Action dated Jan. 27, 2020, filed May 25, 2020, 16 pages.
U.S. Appl. No. 16/409,685—Response to Office Action dated Jul. 14, 2020, filed Oct. 14, 2020, 9 pages.
U.S. Appl. No. 16/411,039—Office Action dated Feb. 10, 2021, 13 pages.
EP 19189235.5 Rule 71(3)—Intent to Grant, dated Dec. 17, 2020, 7 pages.
JP 2019081108 First Office Action, dated May 18, 2021, 7 pages.
JP 2019081108 Response to First Office Action, dated May 19, 2021, filed Sep. 3, 2021, 7 pages.
EP 19727564.7—Voluntary Amendments filed on Dec. 22, 2020, 5 pages.
Netskope, "The 5 Steps to Cloud Confidence," netSkope, Inc., 2014, 11 pgs.
"Netskope Cloud Confidence Index," netSkope, Inc., 2015, 4 pgs.
U.S. Appl. No. 16/408,215 Preinterview First Office Action dated Sep. 23, 2021, 21 pgs.
U.S. Appl. No. 16/411,039—Office Action dated Oct. 21, 2021, 37 pages.
JP 2019-081108 Notice of Allowance, dated Oct. 26, 2021, 5 pages.
EP 19189235.5 Certificate of Grant, dated Aug. 18, 2021, 1 pages.
EP 19727564.7 Rules 161(1) and 162 Communication, dated Jan. 15, 2021, 3 pages.
EP 19727564.7 Response to Rules 161(1) and 162 Communication dated Jan. 15, 2021, filed Jul. 26, 2021, 12 pages.
U.S. Appl. No. 16/411,039—Response to Office Action dated Feb. 10, 2021, filed Jul. 9, 2021, 18 pages.
EP 17713822.9 Decision to Grant, dated Aug. 1, 2019, 2 pages.
JP 2019-081108 Response to First Office Action dated May 18, 2021, filed Sep. 21, 2021, 13 pages.
Li et. al., Security Intelligence—A Practitioner's Guide to Solving Enterprise Security Challenges, Wiley, dated 2015, 363 pages.
McAfee, McAfee Data Loss Prevention Endpoint, dated May 2017, 3 pages.
Symantec, Symantec Data Loss Prevention for Endpoint, dated May 2011, 3 pages.
Netskope, Netskope Active Cloud DLP, dated 2015, 4 pages.
Baron et al., AWS certified Solutions Architect—Official Study Guide, Amazon Web Services, Wiley & Sons publication, dated 2017, 517 pages.
U.S. Appl. No. 16/411,039—Response to Office Action dated Oct. 21, 2021, filed Jan. 21, 2022, 12 pages.
PCT/US2017/021969—Article 34 Amendment, filed Jan. 11, 2018, 16 pages.
U.S. Appl. No. 16/118,278—Office Action dated Nov. 25, 2020, 16 pages.
Li et al., Security Intelligence—A Practitioner's Guide to Solving Enterprise Security Challenges, Wiley publications, dated 2015, 363 pages.
U.S. Appl. No. 16/118,278—Response to Office Action dated Nov. 25, 2020, filed May 25, 2021, 16 pages.
U.S. Appl. No. 16/118,278—Final Office Action, dated Aug. 12, 2021, 34 pages.
U.S. Appl. No. 16/118,278—Response to Final Office Action dated Aug. 12, 2021, filed Feb. 14, 2022, 13 pages.
U.S. Appl. No. 15/368,240, filed Dec. 2, 2016, U.S. Pat. No. 10,826,940, Nov. 3, 2020, Granted.
U.S. Appl. No. 15/368,246, filed Dec. 2, 2016, U.S. Pat. No. 11,019,101, May 25, 2021, Granted.
U.S. Appl. No. 16/000,132, filed Nov. 3, 2020, U.S. Pat. No. 10,291,657, May 14, 2019, Granted.
U.S. Appl. No. 16/409,685, filed May 10, 2019, U.S. Pat. No. 10,979,458, Apr. 13, 2021, Granted.
U.S. Appl. No. 16/783,146, filed Feb. 5, 2020, U.S. Appl. No. 16/783,146, filed Feb. 5, 2020, Granted.
U.S. Appl. No. 17/227,074, filed Feb. 5, 2020, Pending.
PCT/US2022/014441—International Search Report and Written Opinion dated May7, 2022, 10 pages.

* cited by examiner

|    | w1 | w2 | w3 | w4 | w5 | w6 | w7 |
|----|----|----|----|----|----|----|----|
| u1 | 1  | 5  | 2  | 5  | 6  | 4  | 1  |
| u2 | 10 | 3  | 0  | 0  | 3  | 1  | 3  |
| u3 | 4  | 20 | 40 | 5  | 40 | 20 | 25 |
| u4 | 2  | 3  | 20 | 3  | 4  | 7  | 6  |

```
{
    "event_type": "ITEM_UPLOAD", ——— 514
    "source": {
        "item_status": "active",
        "content_created_at": "2019-04-23T04:55:37-07:00",
        "id": "446613841323",
        "size": 1638,
        "modified_by": {
            "login": "chandra.ns@netskope.com", ——— 534
            "type": "user",
            "id": "1633262496", ——— 544
            "name": "Netskope"
        },
        "file_version": {
            "sha1": "594b79f211940b84452c920b6d6e6c75d2a0436a",
            "type": "file_version",
            "id": "472472989323"
        },
        "created_by": {
            "login": "chandra.ns@netskope.com",
            "type": "user",
            "id": "1633262496",
            "name": "Netskope"
        },
        "etag": "0",
        "purged_at": None,
        "shared_link": None,
        "path_collection": {
            "total_count": 1,
            "entries": [
                {
                    "sequence_id": "0",
                    "etag": "0",
                    "type": "folder",
                    "id": "74622731608",
                    "name": "WebhookTest"
                }
            ]
        },
```

FIG. 5A

```
        "trashed_at": None,
        "content_modified_at": "2019-04-23T04:55:37-07:00",
        "sequence_id": "0",
        "collaborators": {
            "next_marker": "",
            "previous_marker": "",
            "entries": []
        },
        "sha1": "594b79f211940b84452c920b6d6e6c75d2a0436a",
        "name": "box_poll_notif.txt",
        "type": "file",
        "created_at": "2019-04-25T01:46:08-07:00", ——— 548
        "modified_at": "2019-04-25T01:46:08-07:00",
        "owned_by": {
            "login": "chandra.ns@netskope.com",
            "type": "user",
            "id": "1633262496",
            "name": "Netskope"
        }
    },
    "event_id": "8cdd744f-d2b5-49e9-86a0-fb5169909ed",
    "created_at": "2019-04-25T01:46:08-07:00",
    "created_by": {
        "login": "chandra.ns@netskope.com",
        "type": "user",
        "id": "1633262496",
        "name": "Netskope"
    },
    "event_stream": True,
}
```

FIG. 5B

```
{
"event_type": "ITEM_CREATE",                                    604
"source": {
  "item_collection": {
    "total_count": 0,
    "offset": 0,
    "limit": 100,
    "order": [
      {
        "direction": "ASC",
        "by": "type"
      },
      {
        "direction": "ASC",
        "by": "name"
      }
    ],
    "entries": []
  },
  "item_status": "active",
  "content_created_at": "2019-05-22T22:32:42-07:00",
  "id": "7736762556O",
  "size": 0,
  "modified_by": {                                               674
    "login":
"chandra.ns@netskope.com",                                      684
    "type": "user",
    "id": "1633262496",
    "name": "Netskope"
  },
```

FIG. 6A

```
  "created_by": {
    "login":
"chandra.ns@netskope.com",
    "type": "user",
    "id": "1633262496",
    "name": "Netskope"
  },
  "etag": "0",
  "purged_at": None,
  "folder_upload_email":
None,
  "shared_link": None,
  "path_collection": {
    "total_count": 1,
    "entries": [
      {
        "sequence_id": "0",
        "etag": "0",
        "type": "folder",
        "id": "7462273160S",
        "name": "WebhookTest"
      }
    ]
  },
  "description": "",
  "parent": {
    "sequence_id": "0",
    "etag": "0",
    "type": "folder",
    "id": "7462273160S",
    "name": "WebhookTest"
  },
```

FIG. 6B

```
  "trashed_at": None,
  "content_modified_at": "2019-05-22T22:32:42-07:00",
  "sequence_id": "0",
  "collaborators": {
    "next_marker": "",
    "previous_marker": "",
    "entries": []
  },
  "name": "test",
  "type": "folder",
  "created_at": "2019-05-22T22:32:42-07:00",
  "modified_at": "2019-05-22T22:32:42-07:00",
  "owned_by": {
    "login": "chandra.ns@netskope.com",
    "type": "user",
    "id": "1633262496",
    "name": "Netskope"
  }
},
"event_id": "7cdfde23-a647-4129-a604-8d6606b1acff",
"created_at": "2019-05-22T22:32:42-07:00",
"created_by": {
  "login": "chandra.ns@netskope.com",
  "type": "user",
  "id": "1633262496",
  "name": "Netskope"
},
"event_stream": True,
}
```

FIG. 6C

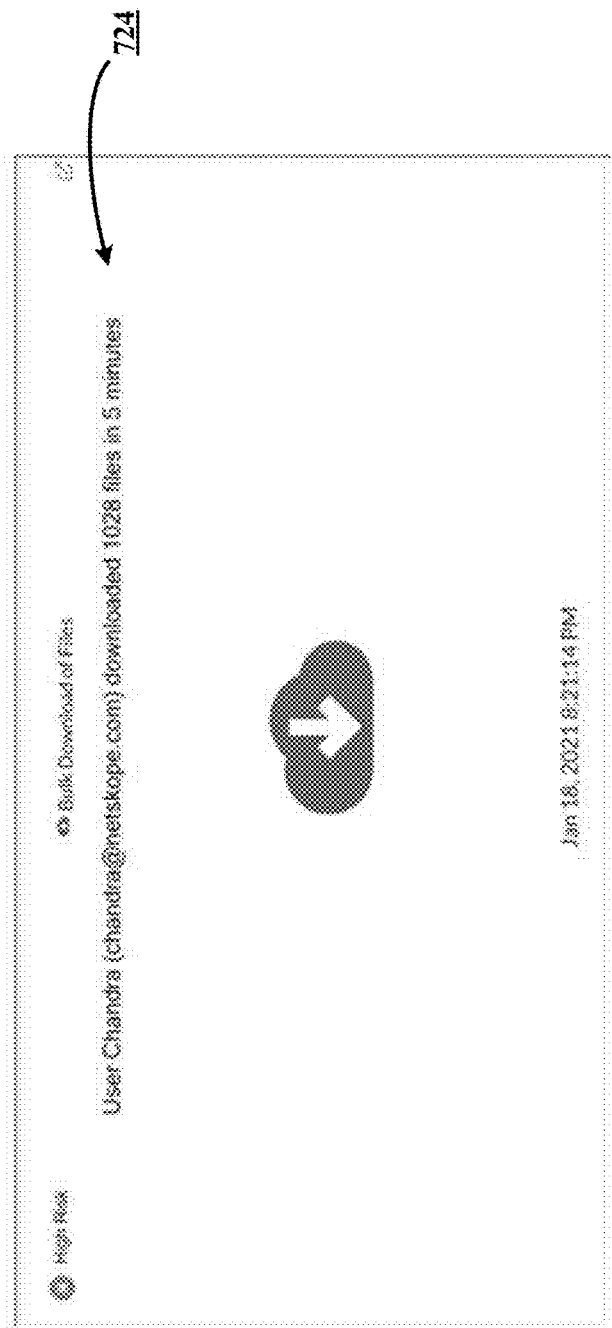

DYNAMIC TOKEN BUCKET METHOD ADAPTIVE TO OPAQUE SERVER LIMITS

CROSS-REFERENCE

This application is a continuation-in-part of U.S. application Ser. No. 17/163,285, titled Dynamic Power User Identification and Isolation for Managing SLA Guarantees, filed 29 Jan. 2021 (U.S. Pat. No. 11,271,953, issued Mar. 8, 2022).

INCORPORATIONS

The following materials are incorporated by reference in this filing:

U.S. Non-Provisional application 14/198,508, entitled "Security For Network Delivered Services", filed Mar. 5, 2014 (U.S. Pat. No. 9,270,765, issued Feb. 23, 2016);

U.S. Non-Provisional application 15/368,240 entitled "Systems and Methods of Enforcing Multi-Part Policies on Data-Deficient Transactions of Cloud Computing Services", filed Dec. 2, 2016 (U.S. Pat. No. 10,826,940, issued Nov. 3, 2020) and U.S. Provisional Application 62/307,305 entitled "Systems and Methods of Enforcing Multi-Part Policies on Data-Deficient Transactions of Cloud Computing Services", filed Mar. 11, 2016 ;

"Cloud Security for Dummies, Netskope Special Edition" by Cheng, Ithal, Narayanaswamy, and Malmskog, John Wiley & Sons, Inc. 2015;

"Netskope Introspection" by Netskope, Inc.;

"Data Loss Prevention and Monitoring in the Cloud" by Netskope, Inc.;

"The 5 Steps to Cloud Confidence" by Netskope, Inc.;

"Netskope Active Cloud DLP" by Netskope, Inc.;

"Repave the Cloud-Data Breach Collision Course" by Netskope, Inc.; and

"Netskope Cloud Confidence Index™" by Netskope, Inc.

FIELD OF THE TECHNOLOGY DISCLOSED

The technology disclosed generally relates to minimizing throughput penalties imposed by software as a service (SaaS) vendors on a user group of, e.g., an organization or a client application due to excessive application programming interface (API) events made from users in the user group, for security and regulatory compliance. More specifically, the technology disclosed relates to dynamic throttling techniques applicable on client-side adaptive to SaaS servers with opaque throttling limits not transparent externally.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The use of cloud services for corporate functionality is common. Research suggests that eighty percent of enterprise workloads will be in the cloud by 2025. According to International Data Corporation, "spending on public cloud information technology (IT) infrastructure surpassed spending on traditional IT infrastructure for the first time in the second quarter of 2020." For example, enterprise companies often utilize software as a service (SaaS) solution instead of installing servers within the corporate network to deliver services.

Enterprise companies typically utilize SaaS solutions instead of installing servers within the corporate network to deliver services. The providers of the SaaS solutions offer a service level agreement (SLA), between the service and a customer, which sets the expectations of assured availability, performance, security and privacy of the customer's data. In turn, the customer expects to be able to collaboratively create, edit and save their data securely among multiple customer branches and data centers.

In one example of the need for sufficient security services, in 2020, the global pandemic caused an abrupt shift to remote work among enterprise knowledge workers, which in turn resulted in an increase in risky behavior. Attackers tried to capitalize on the pandemic, with COVID-19-themed phishing emails, scams and Trojans. During this time interval, techniques used in more sophisticated cyberattacks also continue to evolve. The applicant reports that attackers shifted techniques for initial delivery, with malicious Microsoft Office document files increasing more than sixfold to match or exceed portable executable files in popularity. Attackers continue to abuse popular cloud apps and services to deliver malicious files to their victims in the enterprise, with more than fifty percent delivered through the cloud.

Enterprise companies can utilize SaaS services as a direct customer by subscribing the service by, e.g., registering a corporate account with providers of SaaS solutions (also referred as SaaS vendors interchangeably in this application). Some enterprise companies deliver services by offering products which call downstream services and/or data from the SaaS vendors. In the chain of services, the cloud-based applications provided by the enterprises can deliver services to their users utilizing the services requested from SaaS vendors.

Such cloud-based applications calling downstream service and data from SaaS vendors are referred as client applications of the SaaS vendors in the context of this application. Client applications of SaaS vendors also commonly make service level agreements (SLAs) with their customers for guarantee of their service, which sets the expectations of assured availability, performance, security and privacy of the customer's data. As the client applications calling downstream service from SaaS vendors, the guarantees of SLAs made by the client applications would likely be subject to the availability and performance of the downstream service provided by SaaS vendors.

In addition to the use of SaaS apps by human users, SaaS apps could be integrated with bots or scripts which generate updates to the objects in the SaaS apps. These updates are received as notifications to be identified and inspected to ensure secure service. Meanwhile SaaS apps commonly impose rate limits based on factors such as the number of API calls made on behalf of the user per unit of time, so the number of operations performed on behalf of a user is a factor of the number of API calls per unit time allowed for the user by SaaS apps. Rate limiting is generally put in place as a defensive measure for service providers such as SaaS apps. Shared services need to protect themselves from excessive use—whether intended or unintended—to maintain service availability. Even highly scalable systems would have limits on consumptions on some level.

API calls generated for service requests are a scarce resource to be used efficiently, which motivates the usefulness of limiting operations created in the worker to the volume of work that can be performed for the user. Creating operations and scheduling to the worker blindly for the users and notifications would lead to head of line blocking, causing processing of other users' notifications to be delayed. Thus, for the system to perform well overall, it is essential to design client applications bearing rate limiting in mind to reduce the chances of cascading failure or resource starvation. In the chain or mesh of networked In the chain or mesh of services, many nodes on the system are both clients and servers. Rate limiting on both of the client-side and the server-side is crucial to maximizing the throughput and minimizing end-to-end latency across large distribution systems.

An opportunity arises for maximizing throughput by reducing triggering of throughput penalties imposed by SaaS servers on a user group due to excessive API events made by the user group to the SaaS server with opaque limits not transparent externally.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 4 depicts an example table of API event counts in time windows for multiple users, for tracking of users' impact on the API event rate.

FIG. 5A and FIG. 5B list an exemplary pushed notification received from a third party SaaS vendor for a network event, with the notification metadata in a JSON-style representation.

FIG. 6A, FIG. 6B and FIG. 6C list exemplary metadata for a network event 'item create 604 in a JSON-style representation.

FIG. 7A depicts an example alert, a message for the administrator.

FIG. 7B shows an example email that the administrator receives when a power user violates the configured policy.

DETAILED DESCRIPTION

Figure 1:
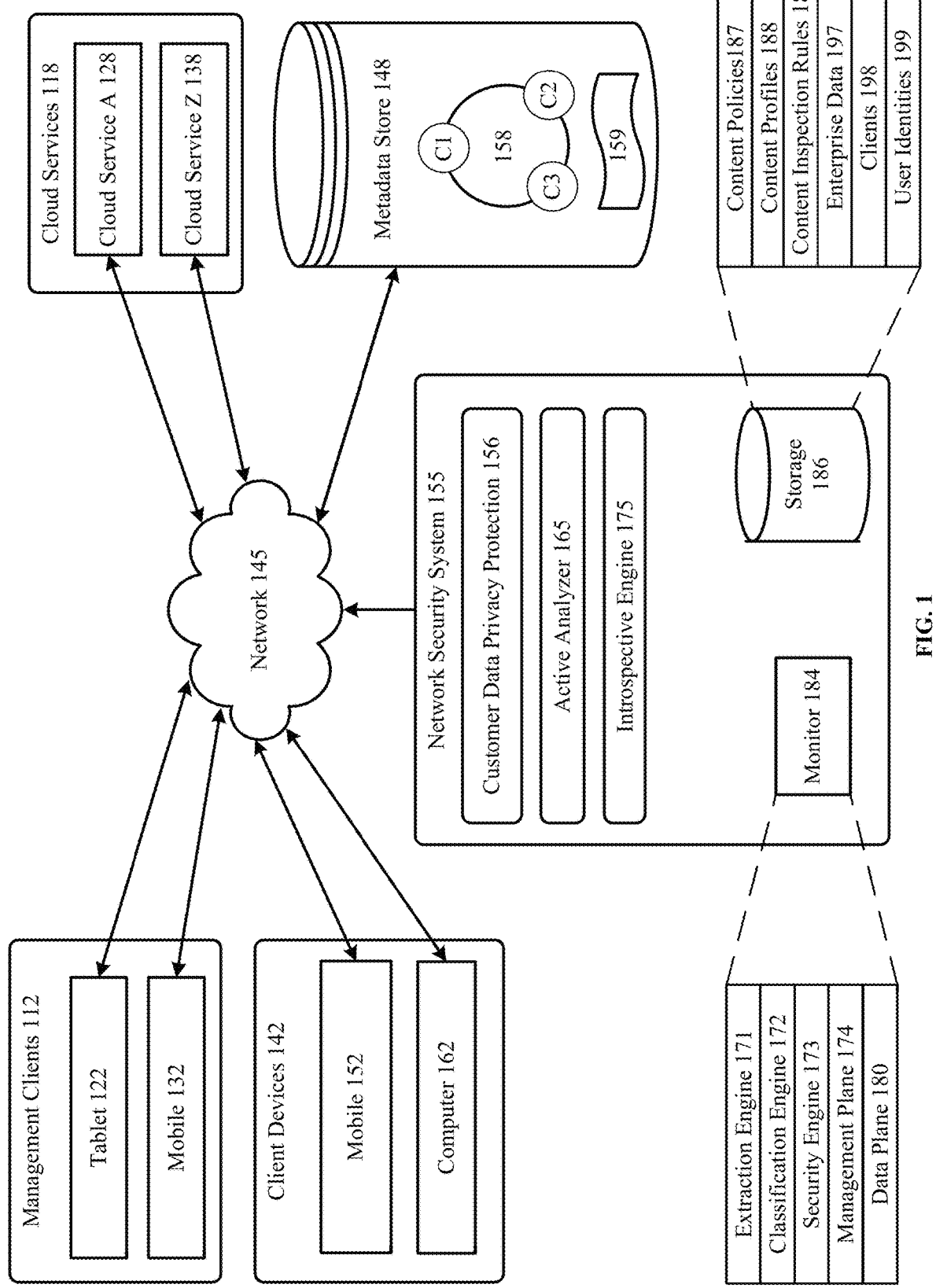
FIG. 1 illustrates an architectural level schematic of a system for avoiding throughput penalties imposed by SaaS vendors on a user group due to excessive API events from users in the user group, in accordance with an implementation of the technology disclosed.

The following detailed description is made with reference to the figures. Sample implementations are described to illustrate the technology disclosed, not to limit its scope which is defined by the claims. Those of ordinary skill in the art will recognize a variety of equivalent variations on the description that follows.

SaaS apps are used by real users, and the SaaS apps are also integrated with bots or scripts which generate updates to the objects in the SaaS apps. The updates are received from SaaS apps as notifications.

SaaS apps impose rate limits for API events, and can set rate limits based on different levels. Some SaaS vendors set baseline throttling limits applied across all accounts and clients. Such baseline throttling limits generally cannot be changed by a customer. A common setting adopted by SaaS vendor is per-account throttling limits that are applied to all API calls in an account. The account-level rate-limit may be increased upon request to the SaaS vendor. Higher limits are possible with APIs that have shorter timeouts and smaller payloads.

Another common setting for rate limits is so-called per-client throttling limits that are based on the user. The number of API events on behalf of the user, per user, can be limited. Per-client throttling limits are applied to clients that use API key associated with client usage plan as client identifier. Note that these limits cannot be higher than the per-account limits.

SaaS apps impose rate limits for API events on behalf of the user per unit of time, so the number of operations performed on behalf of a user is a factor of the number of API events allowed for the user per unit of time. That is, API events are a scant resource to be used efficiently, which drives the usefulness of limiting operations created in the worker process to the volume of work that can be performed for the user. Creating operations and scheduling to the worker process blindly for the users and notifications can lead to head of line blocking-a performance-limiting phenomenon that occurs when a line of packets is held up by the first packet, causing processing of other users' notifications to be delayed.

In the past, the approach for managing the service level agreement (SLA) guarantees has been to react to the rate limit imposed by external applications. While important, this approach does not have enough of an impact to improve resource usage enough to guarantee the SLAs for other clients who should not be impacted by another client's usage.

The technology disclosed solves the technical problem of avoiding throughput penalties imposed by SaaS vendors on a user group due to excessive API events from users in the user group, typically of an organization. The approach disclosed by the applicant monitors API event rate for request from the user group and from individual users in the user group to a SaaS vendor and recognizes a power user as submitting API events in excess of a limit and taking action to reduce the power user's impact on the API event rate of the user group. Once the user has been recognized as a power user, the information gets fed back to the scheduler, which can take an action that disallows the user from continuing the operations intended, based on the rate at which the power user carries out the operations. In one example, the action is to throttle the specific user's notifications workload and ensure that the resources are utilized usefully for other users' notification processing. This approach benefits the system throughput and the organization, also referred to as the customer, because the SLA guarantees for the other users can be maintained, after the power user is identified and their use is throttled to the SLA guarantees which are based on the API quotas available per user. Configurable actions can be set up by an admin as policies that alienate the user from further processing, and can alert the admin if a policy for alerts has been set up. In some embodiments, another configurable policy action can be to create a separate queue for the power user for processing their notifications, to protect the resources needed by the other users in the organization.

An example system for avoiding throughput penalties imposed by SaaS vendors on a user group due to excessive API events from users in the user group of an organization is described next.

System

FIG. 1 shows an architectural level schematic of a system 100 for improving near real time access to SaaS APIs on behalf of an organization. System 100 includes network security system 155, management clients 112, cloud services 118, client devices 142 and public network 145. Network security system 155 includes customer data privacy protection 156, active analyzer 165, introspective engine 175, monitor 184 and storage 186. Monitor 184 of network security system 155 includes extraction engine 171, classification engine 172, security engine 173, management plane 174 and data plane 180. Management clients 112 include tablet 122 and mobile 132, cloud services 118 includes cloud service A 128 through cloud service Z 138, and client devices 142 include mobile 152 and computer 162. Active analyzer 165 enforces policies in real-time on sensitive content using monitor 184 when the sensitive content traverses the network 145. Storage 186 includes content policies 187, content profiles 188, content inspection rules 189, enterprise data 197, information for clients 198 and user identities 199. User identity refers to an indicator that is provided by the network security system to the client device, in the form of a token, a unique identifier such as a UUID, a public-key certificate, or the like. In some implementations, the user identity can be linked to a specific user and a specific device; thus, the same individual can have a different user identity on their mobile phone vs. their computer. The user identity can be linked to an entry or userid corporate identity directory, but is distinct from it. In one implementation, a cryptographic certificate signed by the network security is used as the user identity. In other implementations, the user identity can be solely unique to the user and be identical across devices.

Continuing with the description of system 100, in some implementations, storage 186 can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database, or any other data storing systems or computing devices.

Enterprise data 197 can include organizational data, including but not limited to, intellectual property, non-public financials, strategic plans, customer lists, personally identifiable information (PII) belonging to customers or employees, patient health data, source code, trade secrets, booking information, partner contracts, corporate plans, merger and acquisition documents and other confidential data. In particular, the term "enterprise data" refers to a document, a file, a folder, a webpage, a collection of webpages, an image, or any other text-based document.

In the interconnection of the elements of system 100, network 145 couples management client tablet 122 and mobile 132, client device mobile 152 and computer 162, cloud service A 128 through cloud service Z 138, and network security system 155 in communication. The communication path can be point-to-point over public and/or private networks. Communication can occur over a variety of networks, e.g. private networks, VPN, MPLS circuit, or Internet, and can use appropriate application program interfaces (APIs) and data interchange formats, e.g. REST, JSON, XML, SOAP and/or JMS. All of the communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

Further continuing with the description of the system architecture in FIG. 1, network security system 155 includes monitor 184 and storage 186 which can include one or more computers and computer systems coupled in communication with one another. They can also be one or more virtual computing and/or storage resources. For example, monitor 184 can be one or more Amazon EC2 instances and storage 186 can be Amazon S3™ storage. Other computing-as-service platforms such as Rackspace, Heroku or Force.com from Salesforce could be used rather than implementing network security system 155 on direct physical computers or traditional virtual machines. Additionally, one or more engines can be used and one or more points of presence (POPs) can be established to implement the security functions. The engines can be of varying types including a workstation, server, computing cluster, blade server, server farm, or any other data processing system or computing device. The engine can be communicably coupled to the databases via a different network connection. For example, extraction engine 171 can be coupled via network(s) 145 (e.g., the Internet), classification engine 172 can be coupled via a direct network link and security engine 173 can be coupled by yet a different network connection. For the disclosed technology, the data plane 180 POPs is hosted on the client's premises or located in a virtual private network controlled by the client.

Continuing the description of FIG. 1, system 100 includes network security system 155 with customer data privacy protection 156 which accesses a variety of functions via a management plane 174 and a data plane 180. Data plane 180 includes an extraction engine 171, a classification engine 172, and a security engine 173, according to one implementation. Other functionalities, such as a control plane, can also be provided. These functions collectively provide a secure interface between cloud services 118 and client devices 142. Although we use the term "network security system" to describe network security system 155, more generally the system provides application visibility and control functions as well as security. In one example, thirty-five thousand cloud applications are resident in libraries that intersect with servers in use by client devices 142.

The management clients 112 are computing devices with a web browser with a secure web-delivered interface provided by network security system 155 to define and administer content policies 187, according to one implementation. Network security system 155 is a multi-tenant system, so a user of a management client can only change content policies 187 associated with their organization, according to some implementations. In some implementations, APIs can be provided for programmatically defining and or updating policies. In such implementations, management clients 112 can include one or more servers, for example a corporate identities directory such as Microsoft Active Directory, Google Drive file storage and synchronization service or Slack business communications platform pushing updates, and/or responding to pull requests for updates to content policies 187. Both systems can coexist; for example, some companies may use a corporate identities directory to automate identification of users within the organization while using a web interface for tailoring policies to their needs. Management clients are assigned roles and access to the network security system 155 data is controlled based on roles, e.g. read-only vs. read-write.

A control plane may be used along with or instead of management plane 174 and data plane 180. The specific division of functionality between these groups is an implementation choice. Similarly, the functionality can be highly distributed across a number of points of presence (POPs) to improve locality, performance and/or security. In one embodiment of the disclosed technology, the data plane is on premises or on a virtual private network and the management plane of the network security system is located in cloud services or with corporate networks, as described herein. For another secure network implementation, the POPs can be distributed differently.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same hardware.

Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein. The technology disclosed can be implemented in the context of any computer-implemented system including a database system or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation. In addition, the technology disclosed can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™ Apache Spark™, Apache Kafka™, Apache Flink™, Truviso™, IBM Info-Sphere™, Borealis™ and Yahoo! S4™.

Network security system 155 monitors interactions by users with tens of thousands of cloud-based applications, generating metadata from raw event data, with information gleaned from the cloud application transactions passing through the system. Customer data privacy protection 156 in network security system 155 accepts live network traffic from client devices 142 and generates event metadata on an ongoing basis, to represent events, such as login, file uploads and logout, and including metadata that identifies which users are utilizing which cloud apps. Live network traffic that corresponds to a cloud app interaction stimulates creation of an event, which includes user info, including which app is in use, from which IP address the log entry arrives.

The cloud service detection and content-based function or activity identification uses algorithm-based traffic analysis that discovers cloud services interfacing with an organization's network by deep inspecting services transactions in real time, including calls made to the services. The technology disclosed uses connectors or standardized integrations to interpret the transactions between client devices 142 and cloud services 118. The transactions are decomposed to identify the activity being performed and its associated parameters. The transactions are represented as JSON files, which include a structure and format that allow monitor 184 to interpret what actions a user is performing in the cloud service as it is happening.

In some implementations, the gathered metadata is processed and/or normalized. In some instances, metadata includes structured data and functionality targets specific data constructs provided by the cloud services 118. Non-structured data, such as free text, can also be provided by, and targeted back to, the cloud services 118. Introspective engine 175 is capable of aggregating both structured and non-structured data. For instance, the assembled metadata is stored in a semi-structured data format like a JSON (JavaScript Option Notation), BSON (Binary JSON), XML, Protobuf, Avro or Thrift object, which consists of string fields (or columns) and corresponding values of potentially different types like numbers, strings, arrays, objects, etc. JSON objects can be nested and the fields can be multi-valued, e.g., arrays, nested arrays, etc., in other implementations. These JSON objects are stored in a schema-less or NoSQL key-value metadata store 148 like Apache Cassandra™ 158, Google's BigTable™, HBase™ Voldemort™, CouchDB™, MongoDB™, Redis™, Riak™, Neo4j™, etc., which stores the parsed JSON objects using keyspaces that are equivalent to a database in SQL. Each keyspace is divided into column families that are similar to tables and comprise of rows and sets of columns.

In one implementation, introspective engine 175 includes a metadata parser (omitted to improve clarity) that analyzes incoming metadata and identifies keywords, events, user IDs, locations, demographics, file type, timestamps, and so forth within the data received. Parsing is the process of breaking up and analyzing a stream of text into keywords, or other meaningful elements called "targetable parameters". In one implementation, a list of targeting parameters becomes input for further processing such as parting or text mining, for instance, by a matching engine (not shown). Parsing extracts meaning from available metadata. In one implementation, tokenization operates as a first step of parsing to identify granular elements (e.g., tokens) within a stream of metadata, but parsing then goes on to use the context that the token is found in to determine the meaning and/or the kind of information being referenced. Because metadata analyzed by introspective engine 175 are not homogenous (e.g., there are many different sources in many different formats), certain implementations employ at least one metadata parser per cloud service, and in some cases more than one. In other implementations, introspective engine 175 uses monitor 184 to inspect the cloud services and assemble content metadata.

Figure 2:
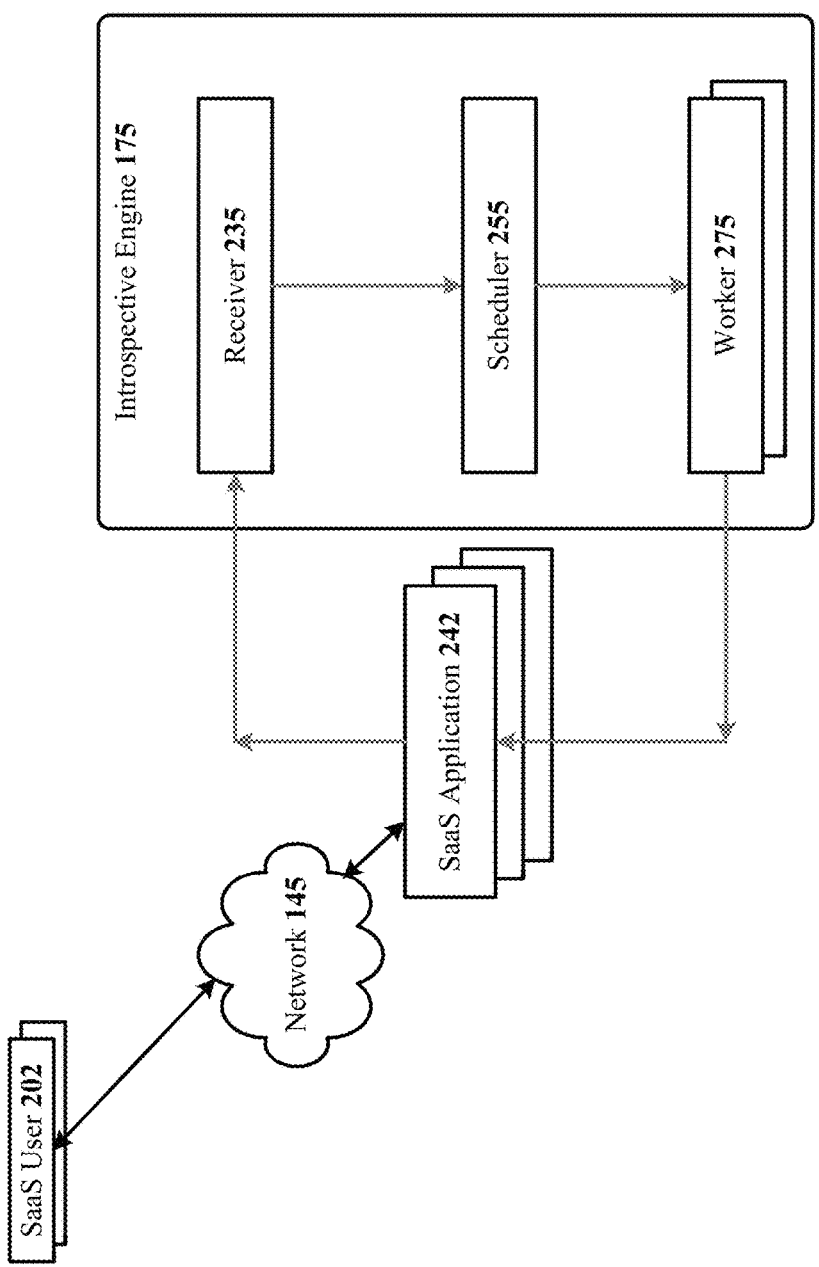
FIG. 2 illustrates a high-level block diagram of the flow of user data representing SaaS application events for introspection.

FIG. 2 illustrates a high-level block diagram 200 of the flow of user data representing SaaS application events for introspection. SaaS user 202 utilizes SaaS application 242 via network 145. SaaS user 202 can operate any of a variety of devices of management clients 112, such as tablet 122 and mobile 132, and can operate from client devices 142 such as mobile 152 and computer 162. Example third party managed cloud SaaS apps include Office 365, Box cloud content management, Salesforce, Google Workplace and Amazon Web Services (AWS). SaaS apps can impose rate limits for API calls, based on the service level agreement (SLA) of an identified user and the number of API calls made on behalf of the user, per unit of time.

SaaS apps can set per-account throttling limits based on the SLA for an organization and the number of API calls made by a group of users in the organization. SaaS apps can set per-account throttling limits based on the SLA for a client application and the number of API calls made by a group of users using the client application. A SaaS application 242 pushes notifications that represent events. Notification metadata for sample events is illustrated in FIG. 5A and FIG. 5B and FIG. 6A, FIG. 6B and FIG. 6C and the example events are described later in this document.

Continuing the description of block diagram 200, introspective engine 175 receives notifications of user events from SaaS applications 242 at receiver 235, on behalf of the user or the administrator of the instance or account. SaaS applications 242 are also integrated with bots or scripts which generate updates to the objects in the SaaS apps via API calls. In one example, a sync application or download bot generates many potential API call events, such as 10,000 operations in one sequence, which can produce a series of operations for a single user within the organization. The single queue can lead to delay of the light-demand users, due to a single heavy-demand user. Introspective engine 175 also receives these updates as notifications. Introspective engine 175 identifies the updates and acts on them. Receiver 235 receives and evaluates the pushed notifications which trigger compliance checking of users and identification of power users. Receiver 235 sends notifications to scheduler 255 which schedules processing to worker 275 that processes the data stream in connection with SaaS application 242. The number of operations performed by a third-party SaaS vendor on behalf of a user is related to the number of API calls allowed for the user per unit time, as one aspect of managing SLA contracts, described earlier. The disclosed technology identifies the user(s) that generate more notifications than the number that can be processed. This alleviates the issue that would occur due to creating operations and scheduling work at worker 275 without information about the number of operations the worker can perform per unit time for the users, as an overwhelming number of notifications would lead to head of line blocking and cause processing of other users' notifications to be delayed.

Figure 3:
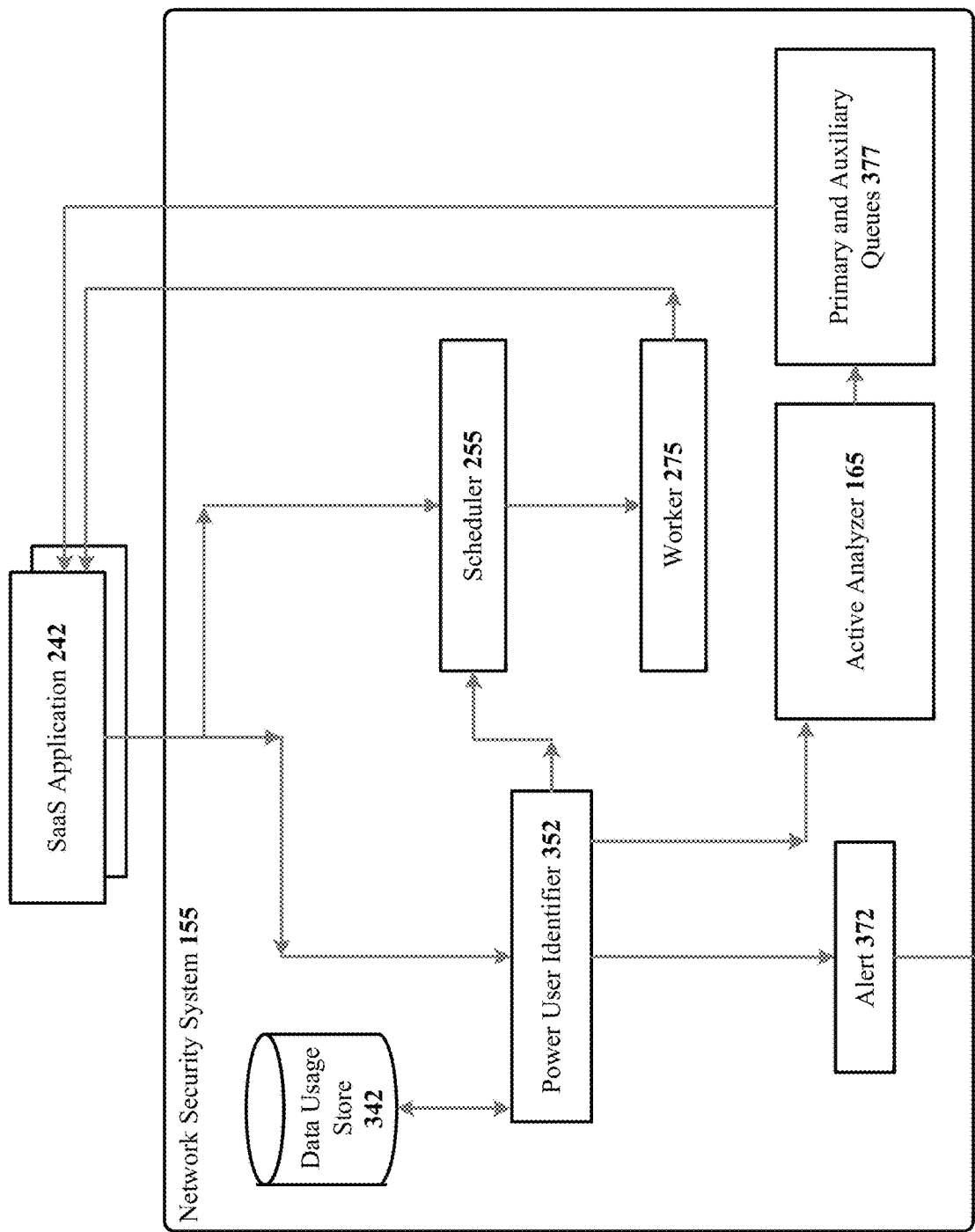
FIG. 3 illustrates a block diagram for identifying a power user who generates more notifications than can be processed per unit time, in accordance with the SLA contract for the user.

FIG. 3 illustrates a block diagram 300 for identifying a power user who generates more notifications than can be processed per unit time, in accordance with the SLA contract for the user. Network security system 155 uses power user identifier 352 to uniquely identify power users using the login and ID in the notification metadata, and for monitoring the API event rate for requests from the user group, collectively, and from individual users in the user group, to a SaaS vendor. In one case, SaaS application 242 sends notifications for API events from users in a user group to power user identifier 352 and to scheduler 255. Power user identifier 352 recognizes a power user as submitting API events in excess of a limit, and can determine when an identified user is consuming more than their allotted number of operations per unit time as specified in the organization's SLA. Power user identifier 352 feeds the identity of the power user to scheduler 255, which can take action based on the feedback, and generates an alert 372 for an identified power user. Action options are described later in this document. Scheduler 255 takes into account information from power user identifier 352 and the results of tracking the user's data usage when scheduling notification processing by worker 275. In another case, one or more active analyzers 165 monitor the API event rate or volume in time based on counting of API event requests being submitted to the SaaS vendor via primary and auxiliary queues 377. Power user identifier 352 maintains a sliding window for tracking data usage for each user, and at regular time increments, stores the data usage value for each user as an entry in a table in data usage store 342.

FIG. 4 depicts an example table of API event counts in time windows for multiple users, for tracking of users' impact on the API event rate. The table depicts seven sequential time windows for four users for tracking of users'

API event rate over time. Each time SaaS application 242 sends a notification to power user identifier 352, the API event rate and volume get updated in data usage store 342. To recognize a power user, for each user represented in a distinct row of the table shown in FIG. 4, a running sum of values of the previous n windows plus the value added in the current window is calculated. If the sum is greater than a configurable threshold value, then the user is identified as a power user for the next specified amount of time, x. At the end of time period x, the user can be reset from power user to normal user. The user can be marked as a power user each time the sum of values of a configured number of sequential time windows, that is, their data usage, is greater than a threshold value over a sliding window of interest.

In FIG. 4, four users: u1, u2, u3 and u4 are actively generating events. The number of notifications received in each of the seven time-windows: w1, w2, w3, w4, w5, w6 and w7 for each of the four users is listed in the rows of the table. In this example, a configured policy specifies that a power user is defined as a user who uses more than a threshold value of one hundred in the most recent five consecutive slots. The value of the limit is configured to a particular value, based on the value that exceeds or approaches a SaaS imposed trigger of a throughput penalty on the user group. In this example, power user identifier 352 generates alert 372 because the sum for u3 of the number of notifications in five consecutive time windows 455 (shaded) is 4+20+40+5+40=109. The user u3 is designated a power user due to submitting API events in excess of the limit set in this example of one hundred. When a user is recognized as a power user, transmittal of API event submissions from the power user to the SaaS are rationed to avoid triggering of a throughput penalty by the SaaS. In some case, the power user is a bot programmed to generate the API events.

The overall effect of this disclosed method is to reduce latency for the users in the user group other than the power user, and increase latency for the power user. The policy that describes a power user is configurable for an organization by a human administrator, and represents the requirements of the SLA contract for the organization, in one embodiment.

Introspective engine 175 monitors a range of operations that cause SaaS application 242 to generate API event notifications, including create file, edit file and share file. Files can be shared via the use of collaborate, with options to add user, create link, delete user, delete link, and give permission for user to edit, view, share or unshare. Additional operations include copy, move, download and lock via create lock and delete lock. More operations include delete, undelete, open, preview and metadata update, which are used occasionally. Typically one API call is used for one operations and the one API call corresponds to a single API event.

FIG. 5A and FIG. 5B list an exemplary pushed API notification received from a third-party SaaS vendor for a network event, with the notification metadata in a JSON-style representation. The user is uniquely identifiable, using login 534 and ID 544, as requesting event type 'item upload' 514. The push notification metadata file shown in FIG. 5A and FIG. 5B is not exhaustive of the event-related fields that can be captured in a metadata file, but rather highlights key fields. Power user identifier 352 utilizes 'time created at' 548 when calculating the sliding table entries for user identified by login 534 and id 544.

FIG. 6A, FIG. 6B and FIG. 6C list exemplary metadata for a network API event 'item create' 604 in a JSON-style representation. The unique identifier for the user is captured by login 674 and ID 684, and power user identifier 352 utilizes time 'content created at' 664 for calculating the count of notifications per unit time for identifying power users.

Actions can be configured in response to the API event rate exceeding or approaching a SaaS imposed trigger of a throughput penalty on the user group. A user can be alienated from further processing if the admin has set up a policy to select that option. One action option is to slow the specific user's notification workloads and ensure that the resources are utilized usefully for other users' notification processing. That is, rationing transmittal of API event submission from the power user to the SaaS can be done by cutting off the power user from making API event submissions to the SaaS. The cutting off of the identified power user can be for a predetermined time or until overall submissions by the user group no longer exceed the SaaS imposed trigger. In another action option, rationing can be done by temporarily suspending the power user from making API event submissions to the SaaS. The temporarily suspending can be for a predetermined time or until overall submissions by the user group no longer exceed the SaaS imposed trigger. In some cases, the actions by a user can violate policy. In this case, the configured policy can cause the user to be suspended until the human admin determines that a different action is warranted. In one example, a user can add a shared link to a file, such as a link to Box. Anyone with the shared link can access the file which means that the file is considered public. An example is listed next for adding a shared link to a file:

```
curl--location--request  PUT  'https://api.box.com/2.0/
   files/12345?fields=shared_link'\
--header 'Content-Type:application/json'\
--header                                  'Authorization:
   Bearer{{access_token_redacted}}'\
--data-raw '{
   "shared_link":{
      "access":"open",
      "password":"very-strong-password",
      "vanity_name":"my-shared-link",
      "unshared_at":"2021-12-12T10:53:43-08:00",
      "permissions":{
         "can_download":true
      }
   }
}'
```

An API event initiated by the security policy enforcement or an admin can successfully set the link to Null, so that the original link becomes invalid and the file is not accessible publicly, thereby enforcing the enterprise policy. Typically, this type of policy is set to match any file that has sensitive content that is not expected to be posted publicly. Code for removing a shared link on a file is listed next.

```
curl--location--request  PUT  'https://api.box.com/2.0/
   files/12345?fields=shared_link'\
--header 'Content-Type:application/json'\
--header                                  'Authorization:
   Bearer{{access_token_redacted}}'\
--data-raw '{
   "shared_link":null
}'
```

Another action option can be to alert the admin, sending a notification to a human user to follow up on the cut-off or temporarily suspending. Security policies can include monitoring a rate of notifications for a user per x amount of time, to identify that the user may be taking some action that has been defined by policy as an anomaly. For example, is the user downloading an excessive amount of content, as defined by configured policy? If a user has 100K files, and starts downloading them, after the first 100 notifications in few seconds or a minute, the admin may receive an alert that triggers that something is wrong, so there is a need to stop user. In this case, the human administrator can take one of multiple options of alienating or blocking the user, and/or requiring further credentials for permission to continue the actions.

FIG. 7A depicts an example alert 372, a message 724 for the administrator that power user Chandra downloaded 1028 files in five minutes. FIG. 7B shows an example email that the administrator receives when a power user violates the configured policy, in one embodiment of the disclosed technology. In this example, the power user has been disabled 774 due to the violation.

Figure 8:
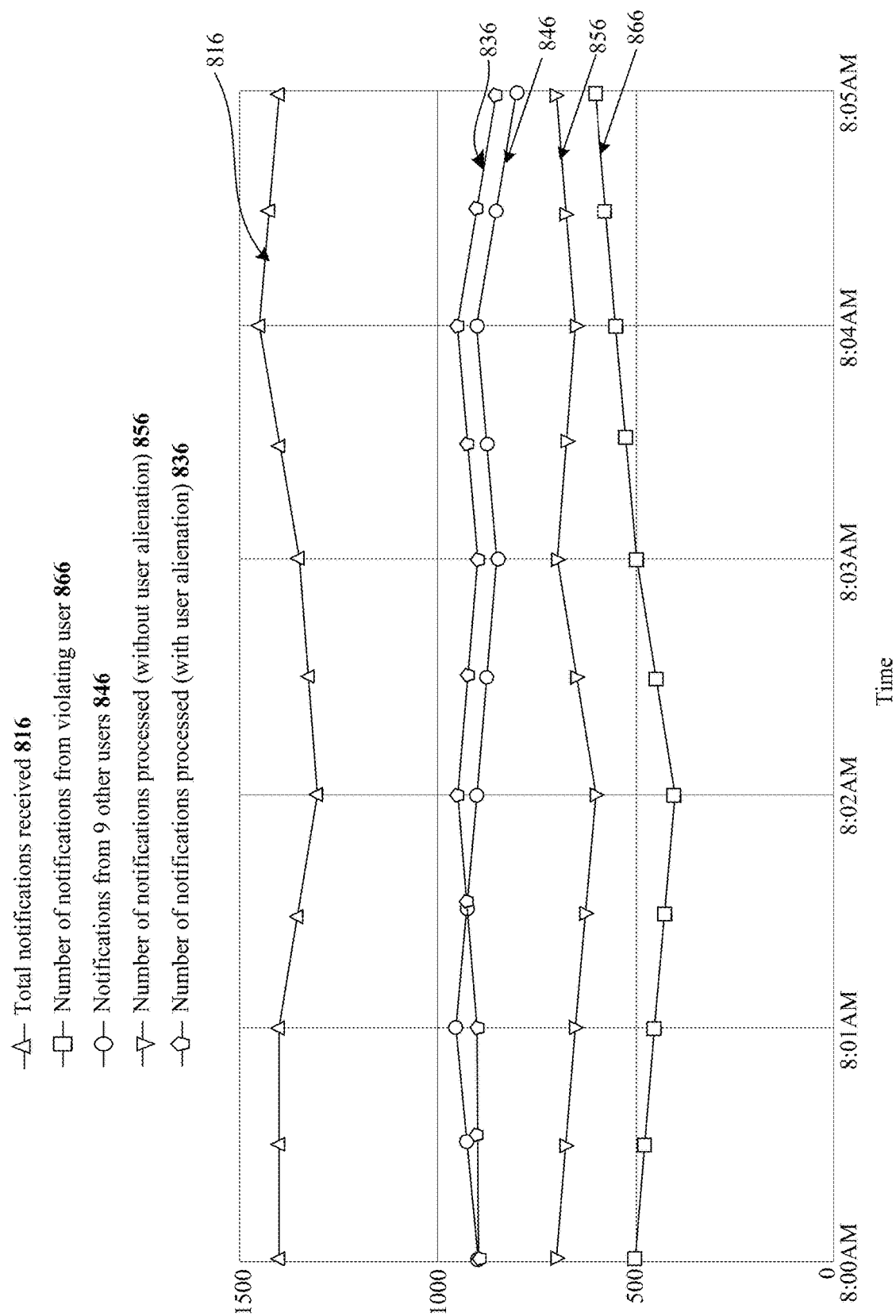
FIG. 8 illustrates reduced latency for nine of ten users, with a graph of API events received over a five-minute time period, with transmittal of API event submissions from the power user to the SaaS rationed via the disclosed method.

FIG. 8 illustrates a graph showing reduced latency for nine of ten users, showing API events received over a five-minute time period. The graph shows the effects of rationing transmittal of API event submissions from the power user to the SaaS rationed via the disclosed method. The total number of API event notifications received 816, which is close to 1500 notifications, is shown by the curve nearest the top of the graph. The graph shows a curve of the number of notifications from the violating user (power user) 866 as approximately 500 events and the notifications from nine other users 846. Two scenarios are depicted via the remaining curves. In one scenario, no user is alienated. That is, the SaaS limits (throttles) API events for all active users, after their composite threshold is reached. The total number of notifications processed with no user alienation 856 is the curve just higher than the curve of number of notifications for just the power user 866. In a second scenario, users are monitored and the power user is recognized as submitting a greater volume in time of API events, in excess of a limit. Transmittal of the power user's API event submissions are rationed, to avoid triggering of the throughput penalty for the user group. In this second scenario, the number of notifications processed with user alienation 836 of the power user is much higher, at close 1000 API event notifications. That is, the latency for the users in the user group other than the power user is reduced and the latency for the power user is increased. It only becomes necessary to slow down the API event rate for the power user when the total demand for processing of API event notifications exceeds a limit triggered by the SaaS.

In a different action, when a power user is recognized, active analyzer 165 can set up a separate queue for processing the power user's event notifications, to protect the resources of the remaining users of the organization's user group. The disclosed process includes monitoring the API event rate or volume in time based on counting by one or more active analyzers of API event requests being submitted to the SaaS vendor in that embodiment. Rationing can be done by assigning the power user to an auxiliary API event queue, managed by a proxy, that slows a rate of submission to the SaaS vendor by the power user. The auxiliary API event queue assignment can be lifted when an updated rate or volume of API event submissions by the power user drops below a reinstatement limit, or when an updated rate or volume of API event submissions by the user group, overall, no longer exceeds the SaaS imposed trigger. In another case, the auxiliary API event queue assignment can be lifted when the auxiliary API event queue is empty or has been below a queue depth limit for a predetermined time. In another case, rationing can be by a proxy assigning the power user to an overflow API event channel that separates processing of submissions on behalf of the power user from submissions on behalf of other users in the user group, and lifting the overflow API event channel assignment when an updated rate or volume of API event submissions by the power user drops below a reinstatement limit. In other cases, lifting the overflow API event channel assignment can be configured for when an updated rate or volume of API event submissions by the user group, overall, no longer exceeds the SaaS imposed trigger, or when the auxiliary API event queue is empty or has been below a queue depth limit for a predetermined time. In some cases, the SaaS can separately meter use of the overflow API event channel.

We describe a workflow for avoiding throughput penalties imposed by SaaS vendors on a user group due to excessive API events from users in the user group next.

Workflow

Figure 9:
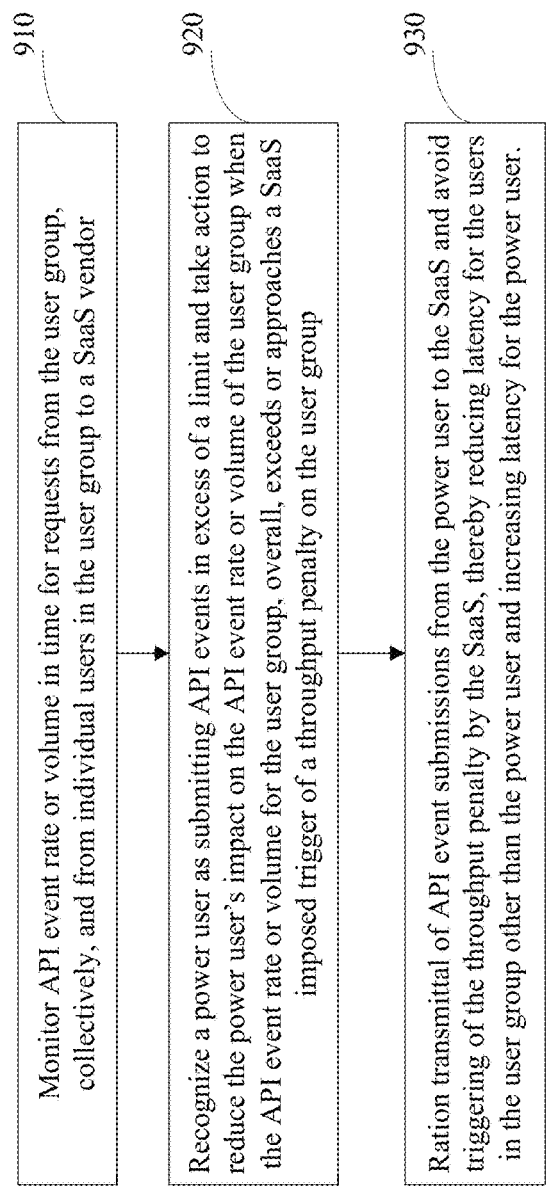
FIG. 9 illustrates a representative workflow for a method for avoiding throughput penalties imposed by SaaS vendors on a user group due to excessive API events from users in the user group in accordance with an implementation of the technology disclosed.

FIG. 9 shows a representative method of avoiding throughput penalties imposed by SaaS vendors on a user group due to excessive API events from users in the user group. Flowchart 900 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 9. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features.

FIG. 9 begins with action 910, which includes monitoring API event rate or volume in time for requests from the user group, collectively, and from individual users in the user group to a SaaS vendor.

Process 900 continues at action 920 recognizing a power user as submitting API events in excess of a limit and taking action to reduce the power user's impact on the API event rate or volume of the user group when the API event rate or volume for the user group, overall, exceeds or approaches a SaaS imposed trigger of a throughput penalty on the user group.

Action 930 includes rationing transmittal of API event submissions from the power user to the SaaS and avoiding triggering of the throughput penalty by the SaaS, thereby reducing latency for the users in the user group other than the power user and increasing latency for the power user.

Other implementations of the method described in this section can include a non-transitory computer readable storage medium storing instructions executable by a processor to perform any of the methods described above. Yet other implementations of the methods described in this section can include a system including memory and one or more processors operable to execute instructions, stored in the memory, to perform any of the methods described above.

Computer System

Figure 10:
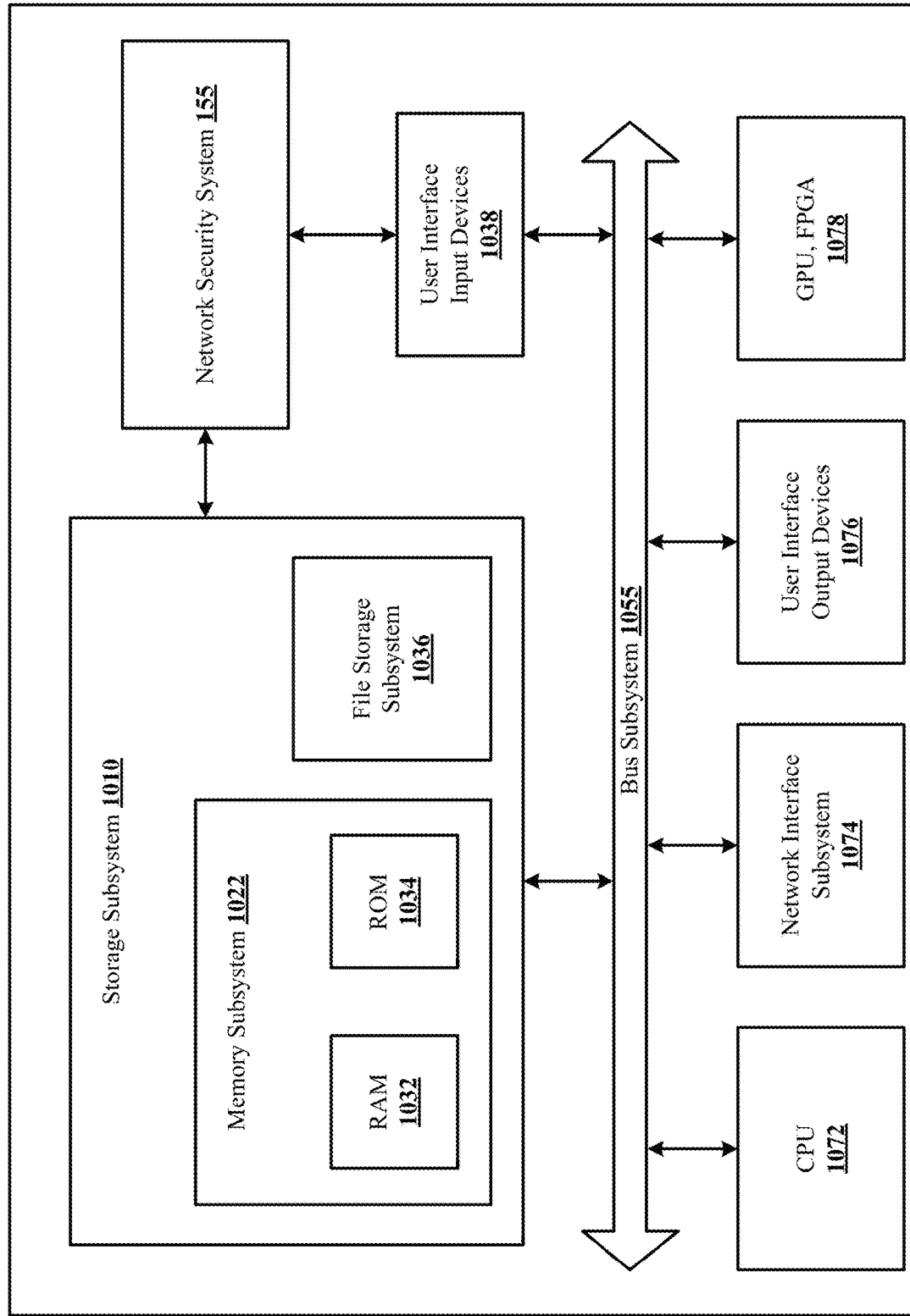
FIG. 10 is a simplified block diagram of a computer system that can be used for avoiding throughput penalties imposed by SaaS vendors on a user group due to excessive API events from users in the user group, in accordance with an implementation of the disclosed technology.

FIG. 10 is a simplified block diagram of a computer system 1000 that can be used for avoiding throughput penalties imposed by SaaS vendors on a user group due to excessive API events from users in the user group. Computer system 1000 includes at least one central processing unit (CPU) 1072 that communicates with a number of peripheral devices via bus subsystem 1055, and network security system 155 for providing network security services described herein. These peripheral devices can include a storage subsystem 1010 including, for example, memory devices and a file storage subsystem 1036, user interface input devices 1038, user interface output devices 1076, and a network interface subsystem 1074. The input and output devices allow user interaction with computer system 1000. Network interface subsystem 1074 provides an interface to outside networks, including an interface to corresponding interface devices in other computer systems.

In one implementation, network security system 155 of FIG. 1 is communicably linked to the storage subsystem 1010 and the user interface input devices 1038.

User interface input devices 1038 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1000.

User interface output devices 1076 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1000 to the user or to another machine or computer system.

Storage subsystem 1010 stores programming and data constructs that provide the functionality of some or all of the modules and methods described herein. Subsystem 1078 can be graphics processing units (GPUs) or field-programmable gate arrays (FPGAs).

Memory subsystem 1022 used in the storage subsystem 1010 can include a number of memories including a main random access memory (RAM) 1032 for storage of instructions and data during program execution and a read only memory (ROM) 1034 in which fixed instructions are stored. A file storage subsystem 1036 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1036 in the storage subsystem 1010, or in other machines accessible by the processor.

Bus subsystem 1055 provides a mechanism for letting the various components and subsystems of computer system 1000 communicate with each other as intended. Although bus subsystem 1055 is shown schematically as a single bus, alternative implementations of the bus subsystem can use multiple busses.

Computer system 1000 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1000 depicted in FIG. 10 is intended only as a specific example for purposes of illustrating the preferred embodiments of the present invention. Many other configurations of computer system 1000 are possible having more or less components than the computer system depicted in FIG. 10.

We describe a workflow for avoiding throughput penalties imposed by SaaS vendors on a user group due to excessive API events from users in the user group in FIG. 9 and a general computer system in FIG. 10, sufra. A background and detailed descriptions about a relevant but new matter which is the subject matter of this continuation-in-part application for a method of reducing triggering of throughput penalties imposed by a SaaS server due to excessive API calls is disclosed in the following sections illustrated with corresponding figures FIG. 11 through FIG. 15.

Background: Limits on Service Requests

Services through internet such as software-as-a-service (SaaS) offerings, platform-as-a-service (PaaS) offering, and Infrastructure-as-a-service (IaaS) offerings shared by multiple users and user groups need to protect themselves from excessive use—whether intended or unintended—to maintain service availability. Rate limiting is generally put in place as a defensive measure for service providers to protect underlying services and resources operated over distributed computing system. The most common reason for rate-limiting is to improve the availability of API-based services to prevent resource starvation.

Services such as software-as-a-service (SaaS) offerings, generally operated in client-server communication, generally apply rate-limiting on client requests for protecting their backend servers from erratic and unpredictable spikes in the volumes of service requests. Rate limiting and quota setting also serve a purpose for service providers to preserve fairness among clients by preventing particular clients from exhausting the resources and thereby starving resources or blocking access for other legitimate users. Clients of such services include a human user, a bot or script, and a combination thereof. A significant client category for SaaS vendors is client applications that provide service to respective users by calling downstream services from one or more SaaS offerings.

There are various ways to limit service requests for maintaining the availability of service. The rate-based quota, for example, sets the maximum number of, e.g., queries per minute. The rate-based rule can enforce a maximum request limit per user or across all users by throttling individual clients to a threshold. The thresholds, generally preset by a SaaS server, may be, in various provisions, configured by a server, a proxy, or a client in accordance with agreements (e.g., service-level agreements (SLAs)) between the parties. In other provisions, SaaS vendors implement a rate-based ban, by which the SaaS vendor would limit rates of requests that match a rule on a per-client basis and then temporarily cut-off or suspend the client from submitting further requests for a time interval when the API calls by the client, for example, exceed the threshold.

Service provided by e.g., SaaS vendors, adopt various techniques for enforcing rate-limiting to protect the underlying service directly or to protect a resource provided by downstream service. There are several different techniques for measuring and limiting rates of service requests, which with their own use and limitations. One of well-known rate-limiting techniques is so called Token Bucket algorithm.

Token Bucket algorithm maintains a rolling and accumulating budget of usage as a balance of tokens. This technique recognizes that client requests does not correspond 1:1 inputs to services requested. The token bucket algorithm can be conceptually understood as follows: first, a token is added to the bucket at some constant rate (e.g., every y). The bucket can hold at the most β tokens. When a client request in a packet of ń bytes is made, the service attempts to remove ń tokens from the bucket by decrementing the token count to fulfill the request. If there are fewer than ń tokens in the bucket, no tokens are removed from the bucket, and the packet is considered non-conformant. In one scenario, the non-conformant packet indicates that the service reaches its limit and causes the service to respond the request with backpressure.

For example, in a GraphQL (a query language) service, a single request might result in multiple operations that are composed into a result. These operations may each take one token. This way, the service can keep track of the capacity that it needs to limit the use of, rather than tie the rate-limiting technique directly to requests. Additional information about the token bucket algorithm can be found at Token bucket, https://en.wikipedia.org/wiki/Token_bucket (last visited Feb. 14, 2022), which is incorporated by reference for all purposes as if fully set forth herein.

Leaky Bucket is another well-known rate-limiting technique. A leaky bucket is similar to a token bucket, but the rate is limited by the amount that can drip or leak out of the bucket. This technique recognizes that the system has some degree of finite capacity to hold a request until the service can act on it; any extra simply spills over the edge and is discarded. Additional information about the Leaky Bucket algorithm can be found at Leaky bucket, https://en.wikipedia.org/wiki/Leaky_bucket (last visited Feb. 14, 2022), which is incorporated by reference for all purposes as if fully set forth herein.

In some implementations, rate-limiting is implemented with an algorithm referred as (r, t) Traffic Shaping. Traffic shaping is a bandwidth management technique used on computing networks which delays some or all datagrams to bring them into compliance with a desire traffic profile. Traffic shaping is used to optimize or guarantee performance, improve latency, or increase usable bandwidth for some kinds of packets by delaying other kinds. Additional information about the traffic shaping can be found at Traffic shaping, https://en.wikipedia.org/wiki/Traffic_shaping (last visited Feb. 14, 2022), which is incorporated by reference for all purposes as if fully set forth herein.

Additionally, rate limiting can be enforced by techniques based on quotas. When the capacity of a service is shared among many users, it can apply rate limiting per user to provide fair and reasonable use, without affecting other users. These limits might be applied over time periods, or they might be applied to resources that are not measured by rate but by quantity allocated. These rate and allocation limits are collectively referred as quotas.

Some services enforcing limits on requests are based on quotas, for example, fixed window limits—such as 3,000 requests per hour or 10 requests per day—are easy to state. Such limits, however, are subject to spikes at the edges of the window, as available quota resets. Consider, for example, a limit of 3,000 requests per hour, which still allows for a spike of all 3,000 requests to be made in the first minute of the hour, which might overwhelm the service provider. As similar limiting on quota, sliding windows have the benefits of a fixed window, but the rolling window of time smooths out the bursts in rate.

Non-Transparent Limits

SaaS vendors, and the like service providers, generally can impose rate limits on multiple bases, e.g., the number of API calls submitted by a user per unit of time (also referred as unit time or unit-time exchangeable in the context of the application), and the number of operations performed on behalf of users for their API calls. The limitations on service requests can be set as allocated quota of requests, API calls in a fixed or sliding window of time. Most service providers document limits of the underlying services such as maximum message size on their products. Many services are transparent on rate limits by publishing a schedule of the rates, e.g., rate-based quotas that specifies how much of a resource can be used in a given time, or the maximum number of queries per second for a certain API.

The rate limits and quota are generally applied at account level of the service, where an account represents, e.g., an enterprise or a corporate client that include a group of users such as employees registered with the service under that account. Services transparent on rates or quota upfront oftentimes document how clients can request increase on rates and quotas with the service providers.

Other services, however, do not explicitly set forth the rate limits or rate-based quotas for customer aware. Instead, such services dynamically adjust rate limits or quotas as reacting in response to the encountered internal loads of backend servers overtime or being based on the volume of concurrent requests submitted from various clients in a given time period. Compounding the internal intricacy of non-transparent throttling incurring on the server-side, many load-based denial-of-service incidents in large systems are not necessarily caused by voluminous requests or malicious attacks, but unintentional-caused by, for example, errors in software or configurations in some other parts of the system.

In cases the rate limits or quotas internally set by SaaS servers are not transparent externally, such service servers are referred as "opaque servers" or "non-transparent servers" interchangeably in the context of this application. Some opaque servers tend to adopt rate-based ban over particular client's requests when the API events generated for that client reach a severe level or exhausting the resource.

In such scenario, clients would likely experience a frequency of incidents imposed by the server of unexpected denials of service, complete stalls, temporary suspending and other interrupts in workflow, collectively referred as throughput penalties in the context of this application. In other scenarios, servers with non-published rate limits would likely adjust down their internal limits and trigger built-in throttling algorithms to remediate voluminous requests in time which reach an advanced-warning margin.

A typical load-denial incident happens when the API call rate of a user or a client application exceed the threshold. The backend server in a reaction would likely temporarily suspend the user from making further requests and command the user, via a response, to wait for a specified time interval before retrying next request. Services like SaaS offerings usually provide advanced-warning with safety margin before critical contention for a resource happens. In some instances, the server of an API-based SaaS vendor would send a response to the client with a message of Hypertext Transfer Protocol (HTTP) response status codes, e.g., HTTP 429 (Too Many Requests) and HTTP 503 (Service Unavailable).

For example, a software-as-a-service (SaaS) built on Microsoft Azure™ sends a message with a HTTP 429 response status code as a warning that indicates too many requests triggering throttling action on the server-side. Some SaaS servers send a HTTP 503 response status code as the response indicates that the service requested is unavailable from the SaaS server, not necessarily due to excessive service requests.

HTTP 429 (Too Many Requests) is one status code of the class of 4xx client errors that is intended for situations in which the error seems to have been caused by the client. 429 status code indicates that the user has sent too many requests in a given amount of time. The HTTP 429 is intended for use with rate-limiting schemes. Other status codes in this class include HTTP 400 (Bad Request) and HTTP 413 (Payload Too Large) that indicate other issues related to requests.

HTTP 503 (Service unavailable) is one status code of the class of 5xx server errors, where status codes of the class indicate cases in which the server is aware that it has encountered an error or is otherwise incapable of performing the request (i.e., server failed to fulfill requests). 503 status code indicates the server cannot handle the request usually because it is overloaded or down for maintenance. Generally, this is a temporary state. SaaS servers usually specify in the responses with a message including a Retry-After: <time interval> response HTTP header that indicates how long the user agent should wait before making a follow-up request.

There are three main cases this header is used: 1) When sent with a 503 (Service Unavailable) response, this Retry-After:<time interval> indicates how long the service is expected to be unavailable; 2) when sent with a 429 (Too Many Requests) response, this indicates how long to wait before making a new request; and 3) when sent with redirect response, such as 301 (Moved Permanently), this value indicates the minimum time that the user agent is asked to wait before issuing the redirected request. A waiting time in the cases of 429 (Too Many Requests) or the cut-off time of 503 (Service Unavailable) are ranged, for instance, between 30 seconds to 5 minutes for SaaS servers built on Microsoft Azure.

A common wait time is 5-10 seconds pause per request. Services processed by, e.g., a Microsoft Azure server may request a longer wait as 30-50 seconds to 5 minutes. Other status codes in this class include HTTP 500 (Internal Server Error) and HTTP 507 (Insufficient Storage). Additional information about the HTTP status codes can be found at List of HTTP status codes, https://en.wikipedia.org/wiki/List_of_HTTP_status_codes (last visited Feb. 16, 2022), which is incorporated by reference for all purposes as if fully set forth herein.

In the instance the SaaS server sends a response to the user with a command to stop making further requests, the user has options to take a conforming action (i.e., the compliant clients) or a non-conforming action in response to the command (i.e., non-compliant clients).

The compliant clients are those in good faith observing the command of the server, halting next requests for the length of the specified time interval and only resuming making requests after the waiting period ends. In this case, the clients have an interval of underperform and frequent interrupts leading to unpredictable performance.

Non-compliant clients are those that disregard server's command to stop and continue making requests to the SaaS app nonetheless. In this scenario, a SaaS vendor typically punishes such a user by either extending the time interval to process the user's additional requests or by banning the client altogether for extended period of time.

While completely non-compliance is neither good for the SaaS server nor serving for the clients, completely compliance on the client-side presents asymmetric compromise to clients'performances. Either of the two actions would nevertheless results in a time interval of delay on the client's workflow. Experiments indicate that single request from a user group delayed due to a stall or suspension imposed by the SaaS server would impact the overall throughput of the group.

Adaptive Throttling Solution

A predictable limit on service requests is preferable for applications as clients that subscribe the SaaS service as such client applications can better adjust their request patterns against the known limit to reduce triggering of throughput penalties imposed by the SaaS server. While the limits of SaaS servers are unbeknownst externally, request patterns cannot be adjusted or optimized accordingly on the client-side. Users are more likely getting interrupted by service denial and suspension when non-transparent limits of the SaaS servers get hit unexpectedly.

Client applications in a chain of services are both clients and servers which make API calls on behalf of their users to the SaaS server for downstream service. When one API call to the SaaS server gets stalled, it could make its share of impact to the overall performance guaranteed by a service in the chain of services. As subsequent work streams would be piled up upon the client applications during the stalled time intervals, chances of hitting limits and occurrences of service denial could get more severe by cumulation. Incidents of unexpected stalls imposed by the SaaS server would make difficult for client applications to maintain service-level agreements (SLA) with users, provided that their performance would be subject to the downstream service performed by SaaS vendors.

To optimize throughput, rate limiting on both the client-side and the server-side is critical to minimize end-to-end latency across large distribution system. A predictable limit on requests are particularly desired for client applications calling services from SaaS servers with non-transparent limits on requests. With predictable limits against the availability of resource, a client application can better adjust its request patterns to optimize the throughput by reducing interrupts and increasing usage of available resource, and thereby improving the likelihood of meeting its service-level agreement (SLA) guarantees.

The technology disclosed by the applicant solves the technical problem of predicting throttling limits and resource availability of a SaaS server with opaque limits not transparent externally by inferring the load conditions of the server. The technology disclosed then dynamically adjusts request patterns to the server for the purpose of reducing triggering of server-imposed throughput penalties that are typically caused by the request rates by clients approaching and/or exceeding the opaque server limits. The disclosed technology takes an proactive action of throttling the rate of the client API calls in accordance with a throttle limit that is dynamically set based on the inferred load conditions of the server and feedbacks from the server in the responses to the service requests. The technology disclosed is implemented in actions that are illustrated in a flowchart presented in FIG. 11.

Figure 11:
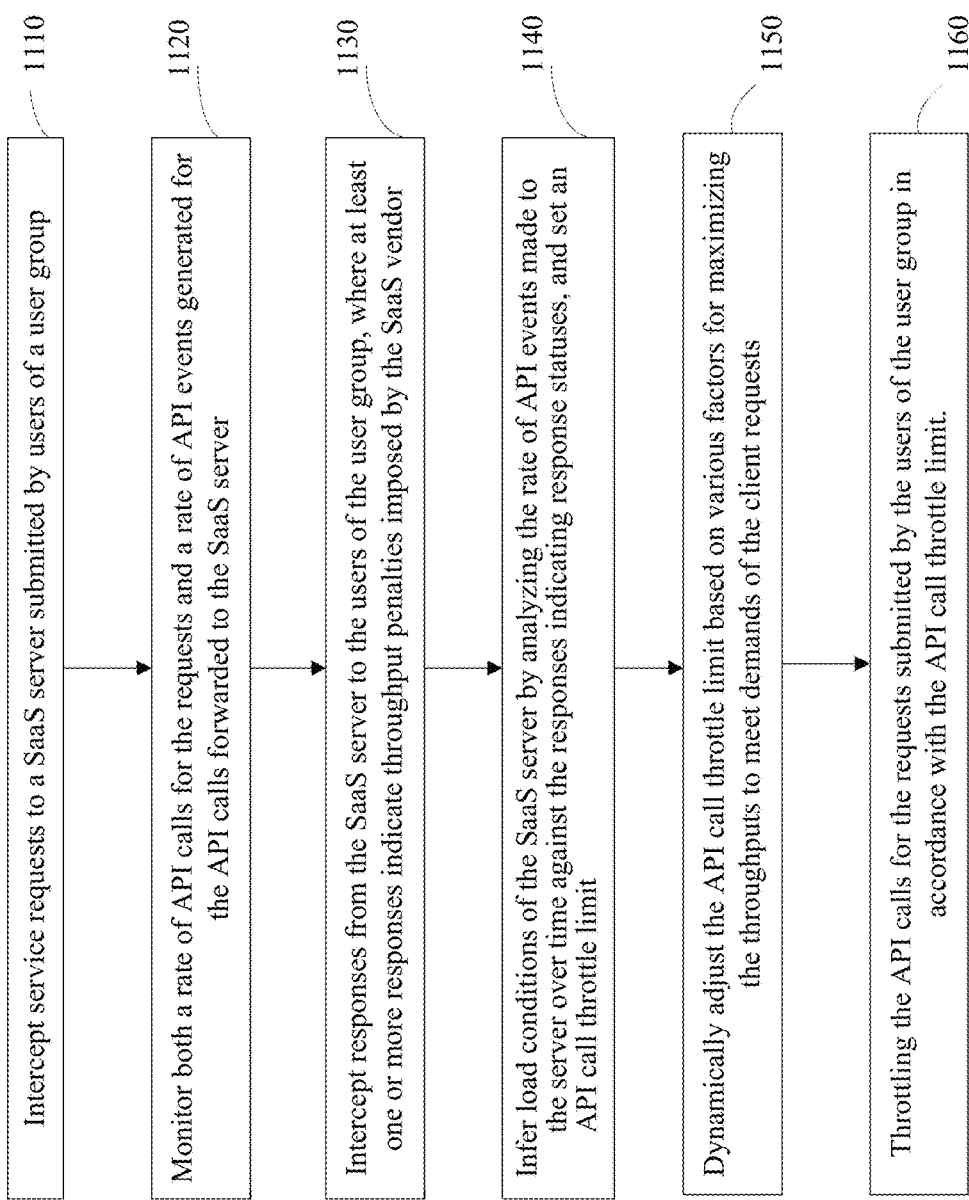
FIG. 11 illustrates a representative workflow for a method of reducing triggering of throughput penalties by employing throttling techniques on client side that are adaptive to SaaS servers with opaque limits not transparent externally.

FIG. 11 shows a representative method of reducing triggering of a throughput penalty imposed by a software-as-a-service (SaaS) server on a group of users due to application program interface (API) calls by the group of users exceeding limits of the SaaS server. The technology disclosed by the applicant solves the problem of reducing triggering of throughput penalties by rate-limiting techniques that are dynamically adapted to the internal load conditions of the server with opaque limits not transparent externally. In some implementations, the SaaS server does not publish a schedule of the rate of the API calls that triggers the imposition of the throughput penalties. In other implementations, the SaaS server dynamically adjusts, over time, the rate of the API calls that triggers the imposition of throughput penalties.

Flowchart 1100 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 11. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features.

FIG. 11 the flowchart 1100 begins with action 1110 which includes intercepting the service requests submitted by users of a user group to a SaaS server for SaaS service. In one implementation, the SaaS server is the server of the target SaaS vendor. In another implementation, the server is one of servers run by the target SaaS vendor. The SaaS server is not limited to a single server machine when the target SaaS vendor runs on a plurality of server machines on a distributed computer system.

Process 1100 continues at action 1120 that monitors both a rate of API calls for the requests submitted by the users of the user group, collectively, and a rate of the API events generated for the API calls actually forwarded to the SaaS server. The rate of the API events in this action is a throttled rate of the API calls, which is algorithmically allowed made to the server in according with a throttle limit described infra. As disclosure sufra, the API events are scarce resource which need to be consumed efficiently. Rate limits are commonly placed on the number of API events per unit time to protect resource from being overwhelmed by too many requests.

In some implementations, the user group is typically an organization or enterprise company having an account with the SaaS vendor. In one implementation, the users thereof can be the employees registered with the SaaS vendor under the same account. In another implementation, the user group as an organization delivers service to its users by utilizing the SaaS services. In other implementations, the users of the user group can be the users registered with a client application which is a client to the SaaS vendor. In a chain of services, the nodes on the systems can be both clients and servers. The client application in such implementations is a client calling downstream service and/or data from the SaaS server, while the same client application is also a server providing service to its registered users.

Software as service (SaaS) vendors generally offer shared services to one or more clients concurrently. The clients as each have a distinctive account with the SaaS vendor are typically not aware of each other. Different clients may request services in parallel to the same SaaS server, therefore further complicating the internal load conditions of the server processing various client requests concurrently.

Process 1100 continues an action 1130 that includes intercepting the network traffic of the responses by the SaaS server responding to the requests submitted by the users of the user group. The responses include at least one or more responses that indicate imposition of a throughput penalty by the SaaS server. To remediate overloading issue on the server-side, the server usually operates several strategies. The server may impose a throughput penalty by dropping the traffic. The requests overloading the system would probably timeout or be denied of the service.

The server may simply not respond to those requests or impose such throughput penalty with a message indicating service not available. In some implementations, the throughput penalty imposed in such scenario can be one of cut-off and temporarily suspending a user of the user group from submitting additional requests to the SaaS server for a pre-determined time. In one implementation, the imposition of the throughput penalty is accompanied by a message from the SaaS server that includes a Hypertext Transfer Protocol (HTTP) 503 response status code (Service Unavailable).

A better solution commonly adopted by SaaS servers is to rate limit the requests (also referred as throttling). Rate limits presents a type of throughput penalty as the processing of client requests would be slowdown. While throttling client requests on the server-side, the server sends a response with a message telling clients that they are sending too many requests. HTTP 429 response status code is built into this protocol precisely for this purpose, provided that this imposed throughput penalty is preceded by a message from the SaaS server that includes a HTTP 429 response status code (Too Many Requests).

While reporting the status of the requests, the responses accompanying throughput penalty usually also include a command that advises the client of an action in response to the throughput penalty. One common command by the SaaS server is to advise the client of stopping sending further requests for a specific time interval. For example, responses from the server include the HTTP 503 response status code accompanied with a Retry-After:<time interval>response HTTP header, together commanding the client to wait for the predetermined time interval before resuming further requests.

Another form of throughput penalty is referred as backpressure where the server-side cooperates with the client-side. The backpressure on the server-side is rate limiting on the rate of API events made to the server, while the client needs to understand the rate limiting feedback and reduce its request rate so that it would stop exceeding the limits of the server. The technology disclosed by the applicant teaches the rate-limiting (i.e., throttling) techniques applicable on client side to adjust the request rate so that it would stop exceeding the limits of the SaaS server even such limits are not transparent externally. The disclosed rate-limiting techniques aims to optimize the throughputs by reducing triggering of throughput penalties while maximizing the throughputs to meet demands of the requests.

Process 1100 continues with action 1140 of inferring load conditions of the SaaS server that vary overtime. In some implementations, the technology disclosed infers the internal load conditions of the SaaS server by employing a rate-limiting algorithm that analyze the rate of API events generated for the API calls made to the SaaS server against the responses with messages indicative of various response statuses that include a successful status and/or imposition of a throughput penalty.

In other implementations, the algorithm is conceptually based on throttling techniques well adopted for throttling the client request rates exceeding the limits of the SaaS server. In some implementations, the algorithm is conceptually based on the Token Bucket algorithm disclosed sufra. In one implementation, the algorithm maintains a rolling and accumulating budget of usage as a balance of tokens in a token bucket.

The disclosed technology employing the algorithm is further configured to set an API call throttle limit based on, among other factors, the inferred load conditions of the SaaS server to adjust request patterns on client side for remediating throughput penalties. In one implementation, the algorithm sets the API call throttle limit dynamically adapted to the inferred load conditions which vary over time. In one implementation, the API call throttle limit is set to adjust the rate of the service requests. In other implementations, the throttle limit set to adjust the rate of API calls for the requests.

In another implementation, the technology disclosed set the API call throttle limit based at least in part on a successful ratio of total API calls for the requests submitted by the user group overall versus the API events successfully accepted by the SaaS server. In one implementation, the acceptance is indicated by a response accompanied with a message of HTTP 200 response status code (OK).

In one implementation, the algorithm starts with a throttle limit that is preconfigured by the system. In some implementations, the throttle limit includes a throttle rate and burst limit. In some implementations, the algorithm is initiated with a preconfigured API call throttle limit. In other implementations, the algorithm starts with a preconfigured throttle rate and a burst limit, where the burst limit specifies the maximum bucket size.

The algorithm seeks to attain a middle ground between compliance to the server's command to stall and non-compliance when the server denies clients of service with commands to clients of stopping further requests. In some implementation, the algorithm remediates stalls by the sever by gradually increasing the throttle limit following the reduced throttle limit as the result of remediating the throughput penalty when the server commanded the client to stall. In this implementation, the technology disclosed avoids the throughput penalty of stalls by throttling the request rate of clients, rather than observing the server's command to stall or pause the requests.

In one implementation, the algorithm lowers the throttle limit by a pre-configured percentage (e.g., 10 percent) initially, and continuously reduce the throttle limit until the throughput penalty is avoided or a floor limit is reached. In some implementations, the algorithm steadily increases the throttle limit from the floor limit to increase the throughput for the clients without triggering throughput penalty from the sever, and thereby maximizing the utility of the resource available in the server to fulfill service requests.

The process 1100 includes action 1150 that dynamically adjust the API call throttle limit for the purpose of maximizing the throughput to meet overall demands of the requests from the user group. The API call throttle limit can be determined and adjusted based on various factors including the inferred load conditions of the SaaS server, the responses from the server, rates of API calls for the requests, rates of API events made to the sever, resource demanded by the requests, request patterns, response patterns, and so on.

In some implementations, the disclosed technology configured with the algorithm that steadily adjusts the API call throttle limit by gradually increasing the throttle limit at least when the throttle limit was plummeted in response to substantial throughput penalties imposed by the SaaS server. This implementation aims to increase the throughputs steadily and gradually for the clients, and thereby optimizing the overall throughputs of the requests from clients.

In other implementations, the disclosed technology configured with the algorithm that periodically increases the rate of API events allowed made to the SaaS server above the throttle limit to test dynamically whether the SaaS server has adjusted the limits that trigger imposition of the throughput penalties. This implementation then adjusts the API call throttle limit after inferring that the SaaS server has adjusted the limits that trigger the imposition of the throughput penalty, and thereby optimizing the overall throughputs of the requests from the user group.

The process 1100 continues action 1160 of throttling the API calls for the requests from the user group in accordance with the API call throttle limit that vary overtime to optimize the overall throughputs of the requests from the user group.

Other implementations of the method described in this section can include a non-transitory computer readable storage medium storing instructions executable by a processor to perform any of the methods described above. Yet other implementations of the methods described in this section can include a system including memory and one or more processors operable to execute instructions, stored in the memory, to perform any of the methods described above.

Figure 12:
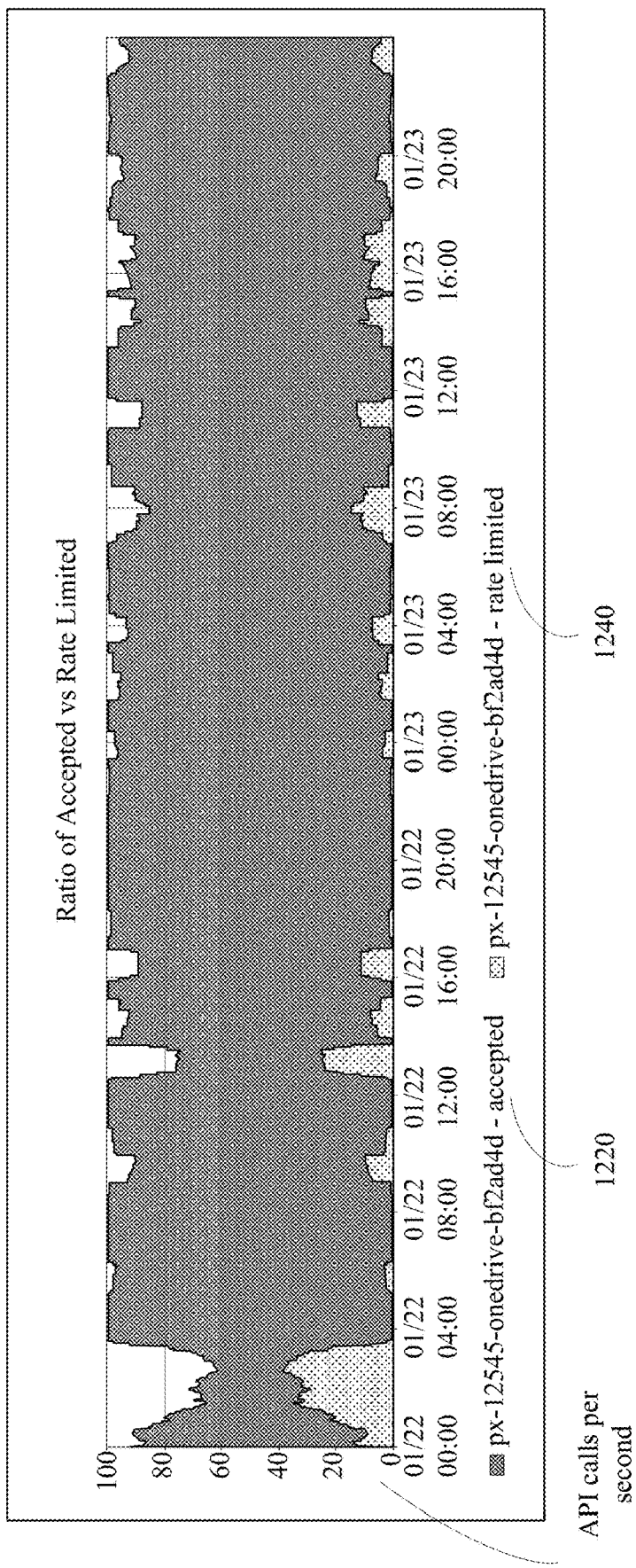
FIG. 12 is an example diagram of showing the ratio of the accepted rate of client API calls vs. client API calls rate-limited by the SaaS server after the operation of the disclosed throttling techniques.

FIG. 12 is an example diagram that shows the ratio of rates of client API calls accepted by a SaaS vendor versus rates of client API calls rate-limited by the SaaS server. The legend of the accepted 1220 indicates the numbers of client API calls (shown in Y-Axis) per unit-time that are accepted by the SaaS vendor over the timeline shown in X-Axis. The acceptances are indicated by responses from the SaaS server, e.g., responses accompanied with a message of HTTP 200 response status code (OK). The accepted rate is also referred as the successful rate for the API events made to the SaaS server and successfully accepted by the server in the context of the application.

The legend of rate limited 1240 is referred to numbers per unit-time of client API calls, which are rate-limited and/or halted (i.e., throttled) by the SaaS server. The rate-limited are indicated by responses from the server, e.g., responses accompanied with a message of a HTTP 429 response status code (Too Many Requests). The diagram presents the accepted vs. rate-limited ratio measured under the operation of the technology disclosed by the applicant that employs an algorithm dynamically adjusting the rates of client API events allowed being made to the SaaS vendor based on various factors including, e.g., inferred load conditions of the SaaS server.

In FIG. 12, the diagram shows that the accepted rate is inversive to the rate-limited rate which is the portion of the API event rate not accepted by the SaaS server, provided that the total rate of API events equal to 100 percent in ratio. Note that the FIG. 12 and FIG. 13 through FIG. 15 discussed infra are measured over the same timeline of 24 hours from 1/22 00:00 to 1/23 11:59 to illustrate the correlations between the four figures.

Figure 13:
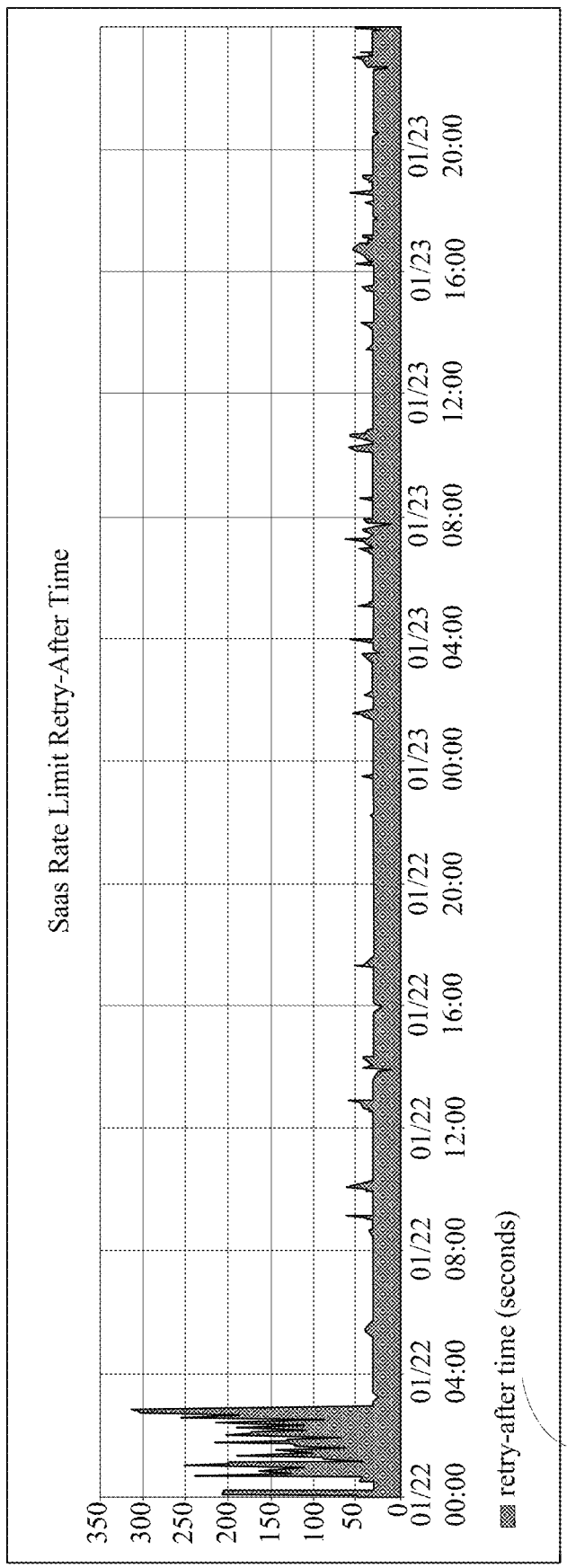
FIG. 13 presents an example graph indicating a time interval in seconds that is specified overtime in the Retry-After response HTTP header as a part of a rate-limited response sent by the SaaS server.

FIG. 13 presents an example graph indicating a time interval in seconds 1320 (shown in Y-Axis) that is specified over the timeline in the Retry-After response HTTP header as a part of server's responses accompanying impositions of throughput penalty. The Retry-After:<time interval> message commands the client to stall/wait/pause for the time interval before making a follow-up request. Stalls are the time periods when clients are forced to stop making any requests to the SaaS vendors. The graph shows substantial spikes of throughput penalties imposed by the server starting at 1/22 00:00 and continuing to close to 1/22 04:00 with retry commands to pause/stall/wait for specified time intervals. The highest time interval commanding the client to pause and wait is over 300 seconds occurred in the proximity of 1/22 03:00.

The same graph also indicates the throughput penalties indicated by the retry-after time were steadily kept low after the spikes under the operation of the technology disclosed. The disclosed technology configured with the algorithm substantively throttled down the rates of client API events allowed made to the server in response to the spikes of Retry-After time intervals as indicated as FIG. 14 discussed infra. The corelated FIG. 12 also indicates the API event rates were substantively rate-limited by the SaaS server during the spikes of the retry-after time intervals.

Figure 14:
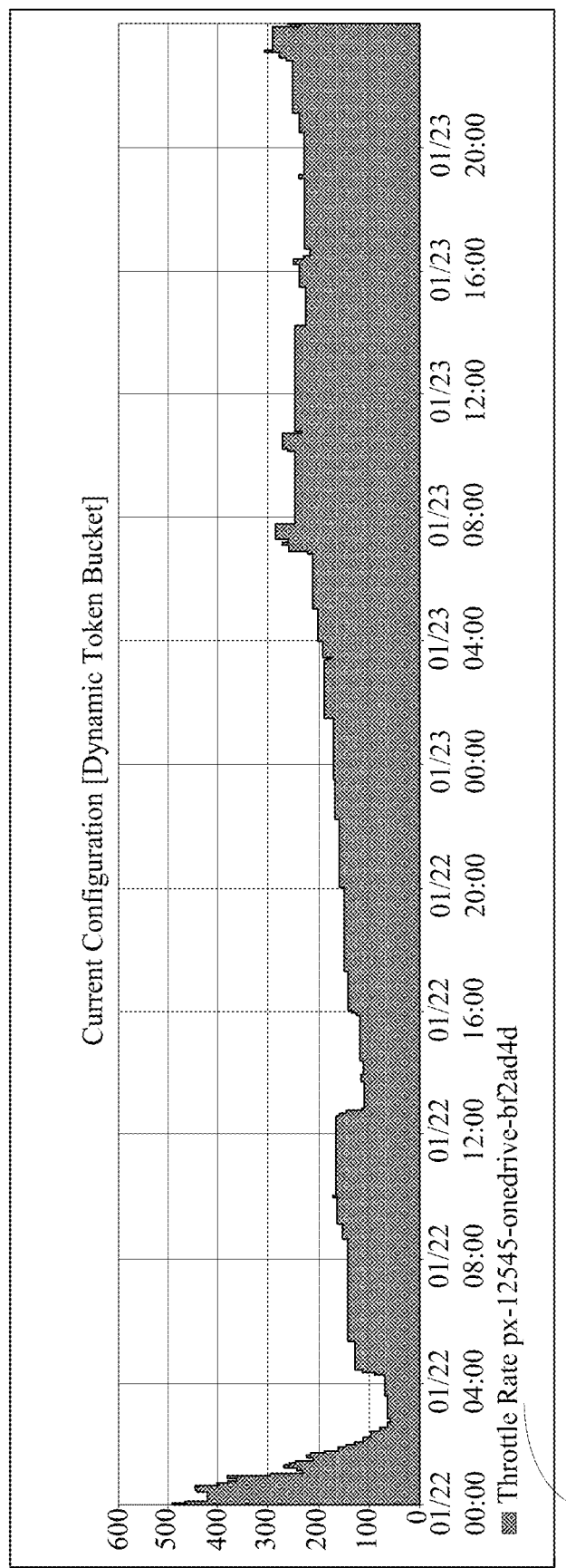
FIG. 14 shows a graph of throttle rate specifying the numbers of client API calls per unit-time that are allowed been forwarded to the SaaS server by the technology disclosed.

FIG. 14 presents an example throttle rate graph resulted in one implementation of the technology disclosed configured with an algorithm named "Dynamic Token Bucket" by the applicant. The throttle rate 1420 (exchangeable with "throttle limit" referred in the application) shows the numbers of client API calls per unit-time (seconds) that are allowed by the disclosed technology to be made to the SaaS vendor for service thereof.

The Throttle Rate graph appears that the throttle rate was descended rapidly in response to the spikes of retry-after time intervals that accompany the impositions of throughput penalties commanding the client to pause and wait around 1/22 00:00 to 1/22 03:00 proximately. The throttle rates were then steadily and gradually increased over time under the operation of the disclosed technology to allow more numbers of API events per unit-time made to the server for processing, and thereby maximizing the throughputs to meet demands of the requests.

Figure 15:
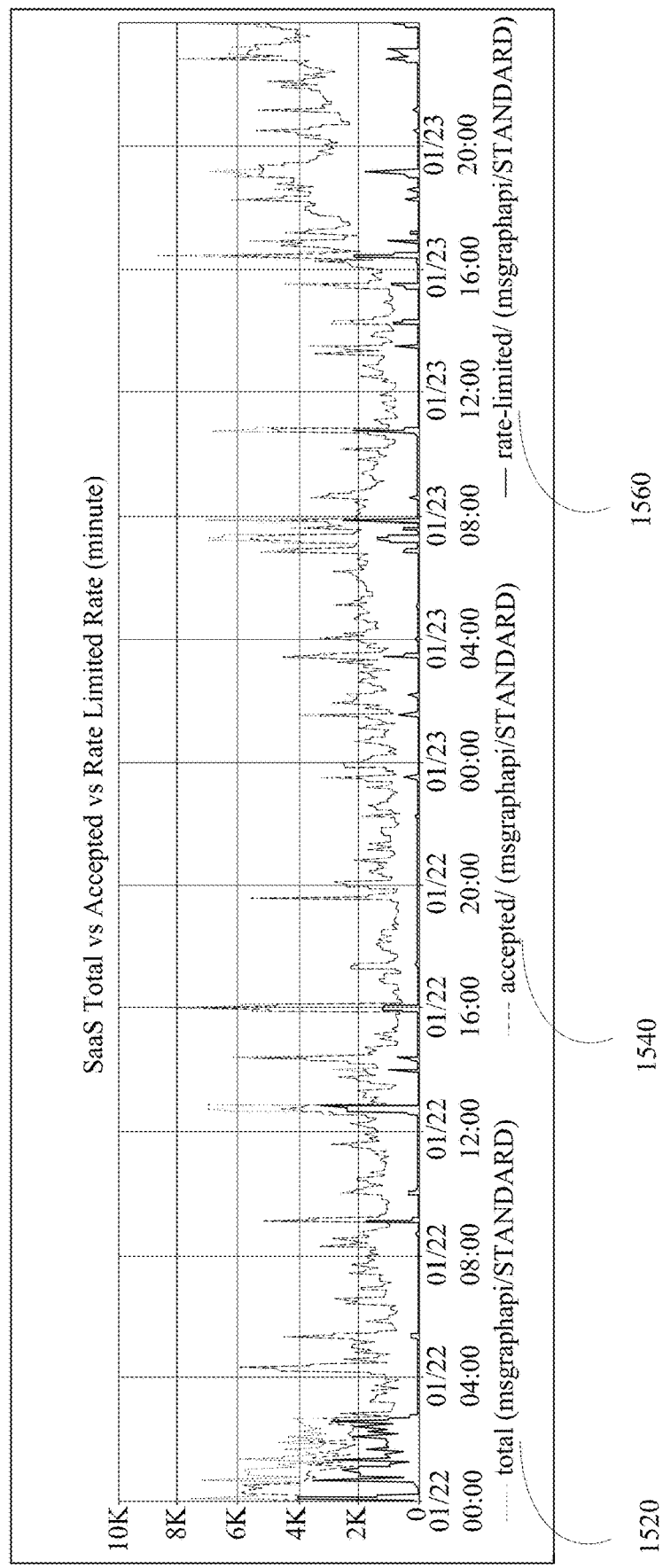
FIG. 15 shows a diagram of three squarely overlapped graphs of actual numbers illustrating the correlation between rates of total client API calls vs. rates accepted by the SaaS server vs. rates of client API calls rate-limited by the SaaS server.

FIG. 15 shows an example diagram combining three graphs squarely overlapped over the same timeline to illustrate the dynamics between the total rate vs. accepted rate vs. rate-limited rate. The Total Rate 1520 presents the total numbers of client API events per unit-time generated for service requests made to the SaaS server. The Accepted Rate 1540 measures the numbers of client API calls per unit-time that are successfully accepted by the SaaS vendor. The Accepted rate is also referred as the successful rate in the disclosure. The Rate-Limited Rate 1560 shows the numbers of client API calls per unit-time that are limited and/or halted (i.e., throttled) by the SaaS server. The three overlapped graphs present actual numbers scaled in 1,000 units of Y-axis (unit in minute) rendered by the SaaS APIs.

The corelated FIG.11 to FIG. 15 indicate that the technology disclosed results a significant increase in the successful rates of client API calls accepted at the server-side of the SaaS vendor. More importantly, by the operation of the disclosed technology, there are no stalls incurred over the entire demonstrative timeline indicated by the ratio of the accepted rate versus the rate-limited rate stays substantially high over time.

Since the technology disclosed configured with algorithms adapts to the real-time conditions seen by clients, the clients are successful on 100% of the calls it makes when the server is lightly loaded or receiving less traffic. If the service server has a high load or experiences heavy traffic, then the algorithm of disclosed technology adapts to the load conditions of the SaaS server and takes a throttling action with aim to maximize the API calls accepted at the server-side under such load conditions.

The technology disclosed can be appliable to all clients or client applications that make cloud-based service requests to external SaaS vendors. Examples of the API-based client applications include introspection, Cloud Application Security Broker (CASB), Cloud Security Posture Management (CSPM), SaaS Security Posture Management (SSPM), and the like.

Particular Implementations

Some particular implementations and features for reducing triggering of throughput penalties imposed by a server of a software as a service (SaaS) vendor on a group of users due to application program interface (API) calls made by the users of the group exceeding limits of the SaaS server are described in the following discussion.

In one disclosed implementation, a method of reducing triggering of throughput penalties imposed by a server of a SaaS vendor due to excessive API calls made by users in the group includes intercepting requests to the SaaS server submitted by users of a user group is disclosed. The method includes monitoring both a rate of API calls for the requests and a rate of API events generated for the API calls being forwarded to the SaaS server. The method also includes monitoring return traffic by intercepting responses from the SaaS server to the users of the user group, where at least one or more of the responses indicate imposition of a throughput penalty by the SaaS server.

Based on the monitoring of the transaction traffic forward and feedback, the method can further include the actions of inferring load limits imposed of the SaaS server by analyzing the rate of API events made to the SaaS server overtime against the responses that indicate imposition of the throughput penalty and setting an API call throttle limit dynamically adaptive to the inferred load conditions. The disclosed method further can include the action of throttling the rate of the API calls on behalf of the user group for the requests submitted by the users of the user group to the SaaS server in accordance with the API call throttle limit.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations.

In one implementation, the SaaS server does not publish a schedule of the rate of the API calls that triggers the imposition of the throughput penalties. The SaaS server, in another implementation, dynamically adjusts, over time, the rate of the API calls that triggers the imposition of throughput penalties.

The users of the user group in the method can be the registered members of the user group that has a corporate account with a SaaS vendor running the SaaS server. In an alternative implementation, the users of the user group can be the registered users of a client application that submits API calls on behalf of the users to the SaaS server for downstream service provided by the SaaS vendor.

In the implementations where the SaaS server dynamically adjusts, over time, the rate of the API calls that triggers the imposition of throughput penalties, the method further includes periodically increasing the rate of API events allowed being made to the SaaS server above the API call throttle limit to test dynamically whether the SaaS server has adjusted the limits that trigger imposition of the throughput penalties. In the same implementation, the method also include adjusting the API call throttle limit after inferring that the SaaS server has adjusted the limits that trigger the imposition of the throughput penalty, and thereby optimizing the overall throughputs of the requests from the user group.

In other implementations of maximizing the throughputs to meet overall demands of the requests from the user group, the method further includes steadily and gradually increasing the API call throttle limit over time at least in the circumstances that the API call throttle limit was plummeted in response to throughput penalties imposed by the SaaS server.

In one implementation, the throughput penalty imposed by the SaaS server is one of cut-off and temporarily suspending a user of the user group from submitting additional requests to the SaaS server for a pre-determined time. In some implementations, the imposition of the throughput penalty is preceded by a message from the SaaS server that includes a Hypertext Transfer Protocol (HTTP) 429 response status code (Too Many Requests).

In other implementation, the imposition of the throughput penalty is accompanied by a message from the SaaS server that includes a HTTP 503 response status code (Service Unavailable).

In the implementation where the method includes periodically increasing the rate of API events allowed being made to the SaaS server above the API call throttle limit, the imposition of the throughput penalty is accompanied by a message from the SaaS server that includes a HTTP 503 response status code (Service Unavailable) accompanied by a recommended time interval for retry. The method, in the implementation, further includes periodically adjusting being based at least in part on the recommended time interval for retry.

In one implementation, the method also includes adopting an algorithm that takes the responses of the SaaS server as feedback for inferring the load conditions of the SaaS server and setting the API call throttle limit dynamically. In some implementations, the algorithm maintains a rolling and accumulating budget of usage as a balance of tokens in a token bucket. In another implementation, the algorithm is initiated with a preconfigured API call throttle limit that includes a throttle rate and a burst limit, where the burst limit specifies the maximum bucket size.

Other implementations of the methods described in this section can include a tangible non-transitory computer readable storage medium storing program instructions loaded into memory that, when executed on processors cause the processors to perform any of the methods described above. Unless expressly claimed, the computer readable storage medium does not include a signal. Yet another implementation of the methods described in this section can include a system including memory and one or more processors operable to execute computer instructions, stored in the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A method of reducing triggering of throughput penalties imposed by a server of a software as a service (SaaS) vendor on a group of registered users due to application program interface (API) calls made by the group exceeding limits set by the SaaS server, including:
   intercepting requests to the SaaS server submitted by the registered users in the user group and monitoring both a rate of API calls for the requests and a rate of API events generated for the API calls being forwarded to the SaaS server;
   intercepting responses from the SaaS server to the registered users of the user group, wherein at least one or more of the responses indicate imposition of a throughput penalty by the SaaS server based on a threshold of triggering for imposition of the throughput penalty on the user group;
   inferring load limits imposed by the SaaS server which vary over time by analyzing the rate of API events forwarded to the SaaS server over time against the responses that indicate imposition of the throughput penalty, and setting an API call throttle limit dynamically adaptive to the inferred load limits; and
   on behalf of the user group, throttling the rate of the API calls for the requests submitted by the registered users of the user group to the SaaS server in accordance with the API call throttle limit by at least using an overflow API event channel managed by a proxy through an auxiliary API event queue, thereby avoiding triggering of the throughput penalty by the SaaS server.

2. The method of claim 1, wherein the SaaS server does not publish a schedule of the rate of the API calls that triggers the imposition of the throughput penalties.

3. The method of claim 1, wherein the SaaS server dynamically adjusts, over time, the rate of the API calls that triggers the imposition of throughput penalties.

4. The method of claim 3, further including:
   periodically increasing the rate of API events allowed being made to the SaaS server above the API call throttle limit to test dynamically whether the SaaS server has adjusted the limits that trigger imposition of the throughput penalties; and
   adjusting the API call throttle limit after inferring that the SaaS server has adjusted the limits that trigger the imposition of the throughput penalty, and thereby optimizing the throughput of the requests from the user group.

5. The method of claim 4, wherein the imposition of the throughput penalty is accompanied by a message from the SaaS server that includes a HTTP 503 response status code (Service Unavailable) accompanied by a recommended time interval for retry, further including periodically adjusting being based at least in part on the recommended time interval for retry.

6. The method of claim 1, further including steadily and gradually increasing the API call throttle limit over time at least when the API call throttle limit was plummeted in response to throughput penalties imposed by the SaaS server, and thereby maximizing the throughput to meet overall demands of the requests from the user group.

7. The method of claim 1, wherein the throughput penalty imposed by the SaaS server is one of cut-off and temporarily suspending a user of the user group from submitting additional requests to the SaaS server for a pre-determined time.

8. The method of claim 1, wherein the imposition of the throughput penalty is preceded by a message from the SaaS server that includes a Hypertext Transfer Protocol (HTTP) 429 response status code (Too Many Requests).

9. The method of claim 1, wherein the imposition of the throughput penalty is accompanied by a message from the SaaS server that includes a HTTP 503 response status code (Service Unavailable).

10. The method of claim 1, further including adopting an algorithm that takes the responses of the SaaS server as feedback for inferring the load conditions of the SaaS server and setting the API call throttle limit dynamically, wherein the algorithm maintains a rolling and accumulating budget of usage as a balance of tokens in a token bucket.

11. The method of claim 10, wherein the algorithm is initiated with a preconfigured API call throttle limit that includes a throttle rate and a burst limit, the burst limit specifying the maximum bucket size.

12. The method of claim 1, further including setting the API call throttle limit based at least in part on a ratio of total API calls for the requests submitted by the user group versus the API events accepted by the SaaS server, wherein the acceptance is indicated by a response accompanied with a message of HTTP 200 response status code (OK).

13. The method of claim 1, wherein the users of the user group are registered members of the user group having a corporate account with a SaaS vendor running the SaaS server.

14. The method of claim 1, wherein the users of the user group are registered users of a client application that submits API calls on behalf of the users of the user group to the SaaS server for downstream service thereof.

15. A tangible non-transitory computer readable storage medium, including program instructions loaded into memory that, when executed on hardware processors, cause the hardware processors to implement actions for reducing triggering of a throughput penalty imposed by software as a service (SaaS) server on a group of registered users due to application program interface (API) calls made by the group exceeding limits set by the SaaS server, the actions including:
  intercepting requests to the SaaS server submitted by the registered users in the user group and monitoring both a rate of API calls for the requests and a rate of API events generated for the API calls being forwarded to the SaaS server;
  intercepting responses from the SaaS server to the registered users of the user group, wherein at least one or more of the responses indicate imposition of a throughput penalty by the SaaS server based on a threshold pf triggering for imposition of the throughput penalty on the user group;
  inferring load limits imposed by the SaaS server which vary over time by analyzing the rate of API events forwarded to the SaaS server over time against the responses that indicate imposition of the throughput penalty, and setting an API call throttle limit dynamically adaptive to the inferred load limits; and
  on behalf of the user group, throttling the rate of the API calls for the requests submitted by the registered users of the user group to the SaaS server in accordance with the API call throttle limit by at least using an overflow API event channel managed by a proxy through an auxiliary API event queue, thereby avoiding triggering of the throughput penalty by the SaaS server.

16. The tangible non-transitory computer readable storage medium of claim 15, wherein the SaaS server does not publish a schedule of the rate of the API calls that triggers the imposition of the throughput penalties.

17. The tangible non-transitory computer readable storage medium of claim 15, the actions further including gradually increasing the API call throttle limit over time at least when the API call throttle limit was plummeted in response to throughput penalties imposed by the SaaS server, and thereby maximizing the throughputs to meet overall demands of the requests from the user group.

18. A network security system for reducing triggering of a throughput penalty imposed by software as a service (SaaS) server on a group of registered users due to application program interface (API) events made by the group exceeding limits set by the SaaS server, the system including a hardware processor, memory coupled to the hardware processor, and computer instructions loaded into the memory that, when executed, cause the hardware processor to implement actions that include:
  intercepting requests to the SaaS server submitted by the registered users in the user group and monitoring both a rate of API calls for the requests and a rate of API events generated for the API calls being forwarded to the SaaS server;
  intercepting responses from the SaaS server to the registered users of the user group, wherein at least one or more of the responses indicate imposition of a throughput penalty by the SaaS server based on a threshold of triggering for imposition of the throughput penalty on the user group;
  inferring load limits imposed by the SaaS server which vary over time by analyzing the rate of API events forwarded to the SaaS server over time against the responses that indicate imposition of the throughput penalty, and setting an API call throttle limit dynamically adaptive to the inferred load limits; and
  on behalf of the user group, throttling the rate of the API calls for the requests submitted by the registered users of the user group to the SaaS server in accordance with the API call throttle limit by at least using an overflow API event channel managed by a proxy through an auxiliary API event queue, thereby avoiding triggering of the throughput penalty by the SaaS server.

19. The network management system of claim 18, wherein the SaaS server dynamically adjusts, over time, the rate of the API calls that triggers the imposition of throughput penalties.

20. The network security system of claim 19, the actions further including:
  periodically increasing the rate of API events allowed being made to the SaaS server above the API call throttle limit to test dynamically whether the SaaS server has adjusted the limits that trigger imposition of the throughput penalties; and
  adjusting the API call throttle limit after inferring that the SaaS server has adjusted the limits that trigger the imposition of the throughput penalty, and thereby optimizing the throughput of the requests from the user group.

* * * * *